United States Patent [19]
Levine et al.

[11] Patent Number: 6,073,129
[45] Date of Patent: Jun. 6, 2000

[54] METHOD AND APPARATUS FOR IMPROVING THE PERFORMANCE OF A DATABASE MANAGEMENT SYSTEM THROUGH A CENTRAL CACHE MECHANISM

[75] Inventors: Donald P. Levine; David A. Egolf, both of Glendale, Ariz.

[73] Assignee: Bull HN Information Systems Inc., Billerica, Mass.

[21] Appl. No.: 08/999,248

[22] Filed: Dec. 29, 1997

[51] Int. Cl.[7] ........................................... G06F 17/30
[52] U.S. Cl. ........................... 707/4; 707/2; 707/10
[58] Field of Search ................................ 711/122, 144, 711/121, 140, 164, 119; 707/101, 10, 3, 4, 2, 103, 5; 379/207

[56] References Cited

U.S. PATENT DOCUMENTS

| | | | |
|---|---|---|---|
| 5,023,776 | 6/1991 | Gregor | 711/122 |
| 5,222,224 | 6/1993 | Flynn et al. | 711/144 |
| 5,249,282 | 9/1993 | Segers | 711/122 |
| 5,276,848 | 1/1994 | Gallagher et al. | 711/121 |
| 5,617,568 | 4/1997 | Ault et al. | 707/101 |
| 5,692,152 | 11/1997 | Cohen et al. | 711/140 |
| 5,737,575 | 4/1998 | Blaner | 711/164 |
| 5,752,264 | 5/1998 | Blake et al. | 711/144 |
| 5,812,996 | 9/1998 | Rubin et al. | 707/2 |
| 5,822,749 | 10/1998 | Agarwal | 707/2 |
| 5,835,908 | 11/1998 | Bennett et al. | 707/10 |
| 5,875,462 | 2/1999 | Bauman et al. | 711/119 |
| 5,915,249 | 6/1999 | Spencer | 707/5 |
| 5,974,129 | 10/1999 | Bodnar | 379/207 |

*Primary Examiner*—Wayne Amsbury
*Assistant Examiner*—Thuy Pardo
*Attorney, Agent, or Firm*—Faith F. Driscoll; John S. Solakian

[57] ABSTRACT

A host system includes a multicache system configured within the host system's memory which has a plurality of local and central cache systems used for storing information being utilized by a plurality of processes running on the system. Persistent shared memory is used to store control structure information entries required for operating central cache systems for substantially long periods of time in conjunction with the local caches established for the processes. Such entries includes a descriptor value for identifying a directory control structure and individual sets of descriptors for identifying a group of control structures defining those components required for operating the configured central cache systems. The cache directory structure is used for defining the name of each configured central cache system and for providing an index value identifying the particular set of descriptors associated therewith. The multicache system also includes a plurality of interfaces for configuring the basic characteristics of both local and central cache systems as a function of the type and performance requirements of application processes being run.

40 Claims, 16 Drawing Sheets

Central SQL Cache Search Flow

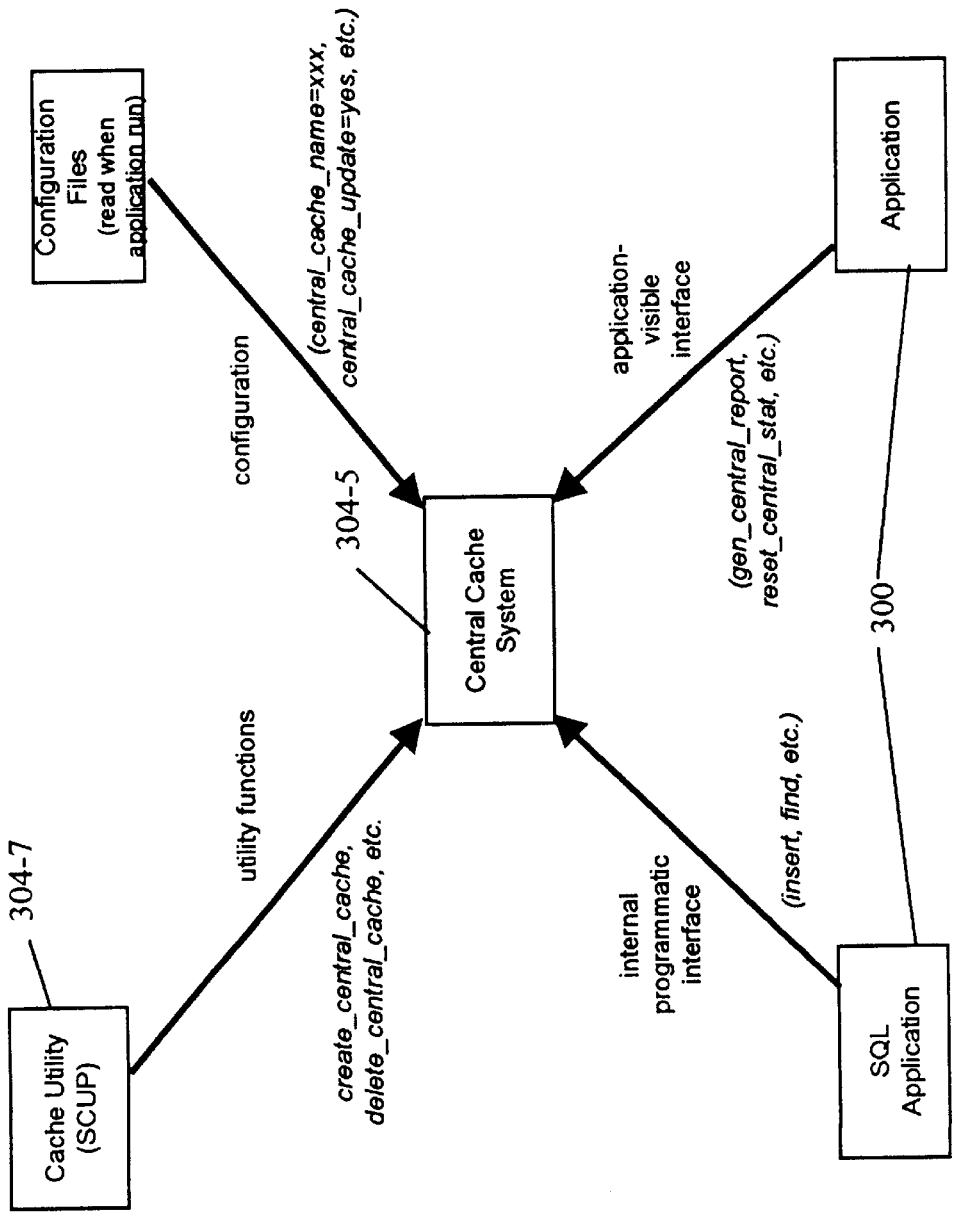

Configuration - Execution Flow

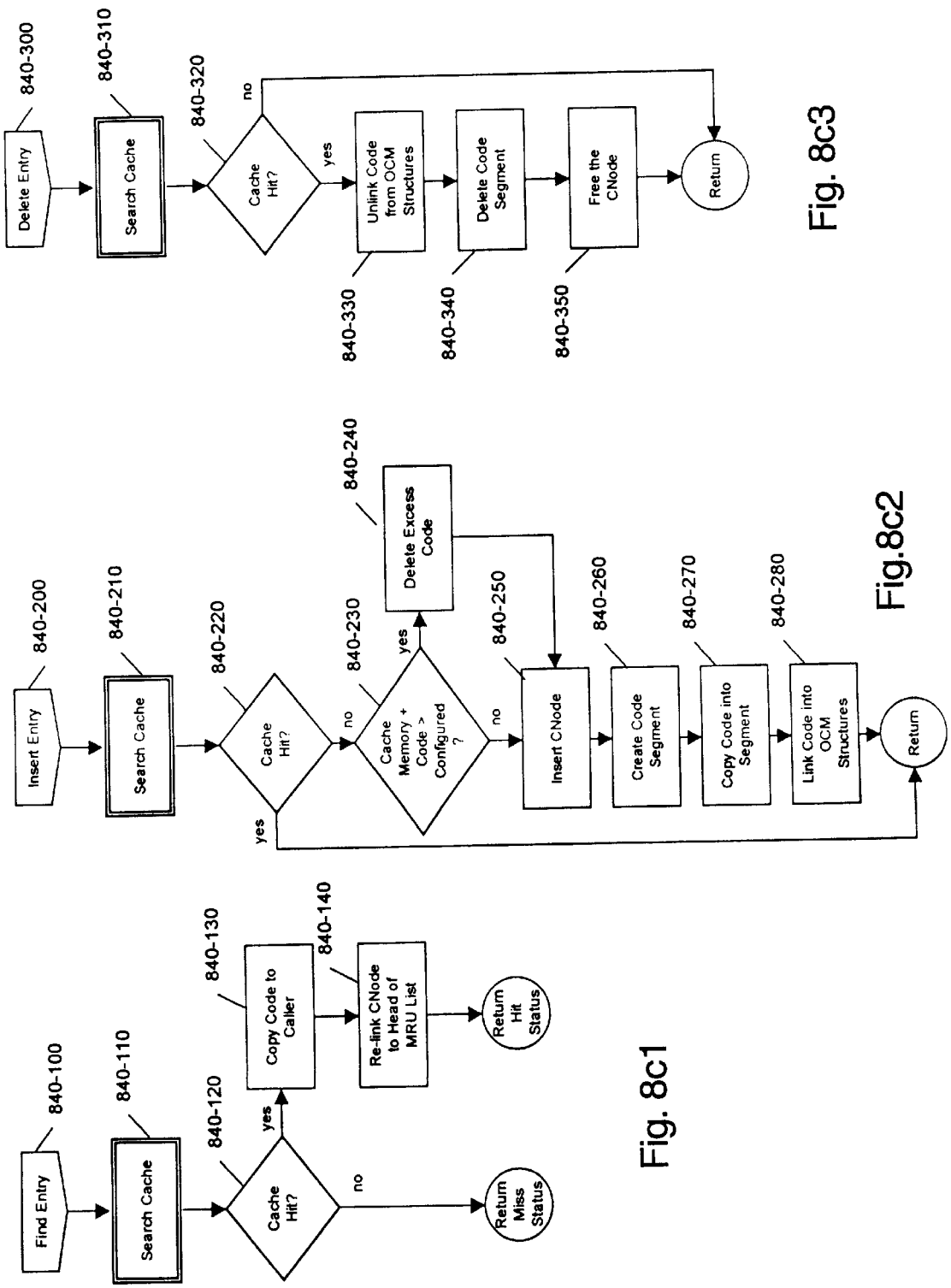

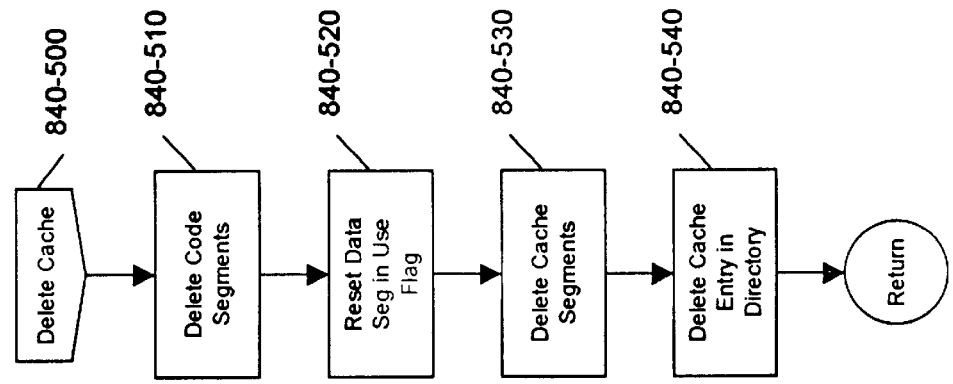
Fig. 8c5
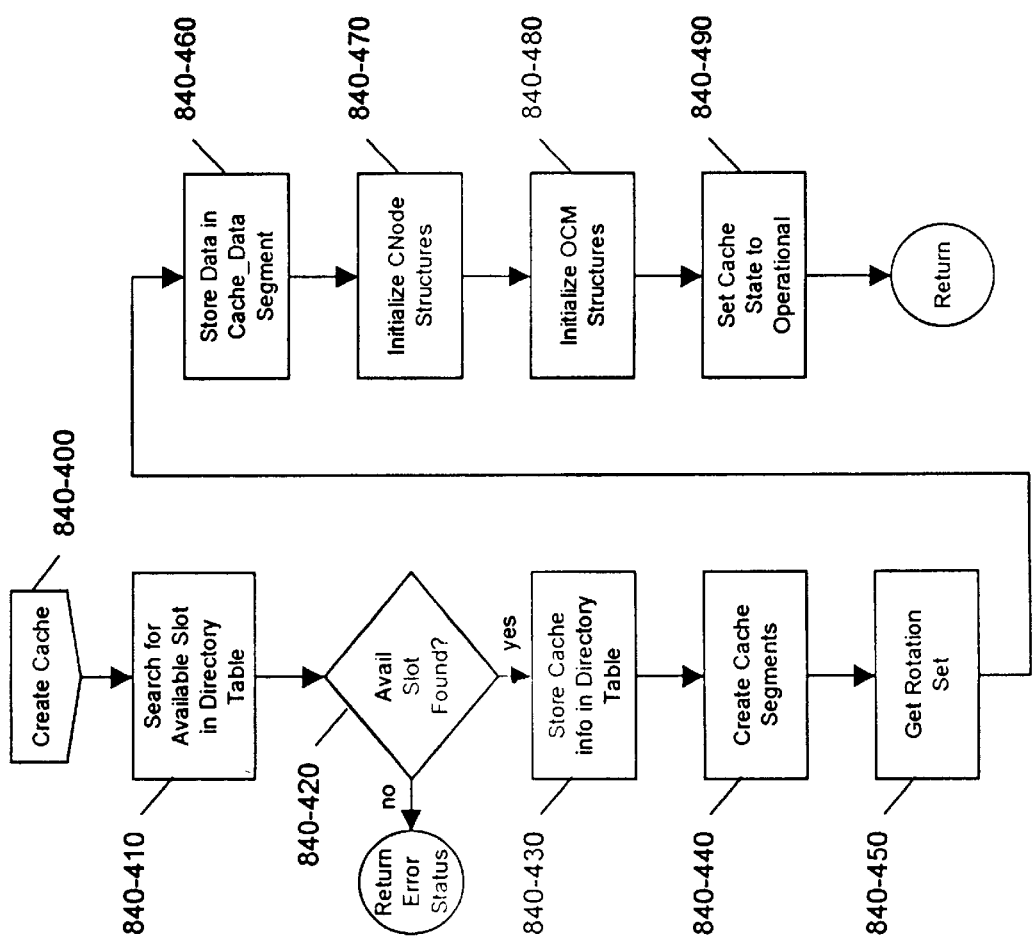
Fig. 8c4

METHOD AND APPARATUS FOR IMPROVING THE PERFORMANCE OF A DATABASE MANAGEMENT SYSTEM THROUGH A CENTRAL CACHE MECHANISM

BACKGROUND OF THE INVENTION

1. Field of Use

The present invention relates to data processing systems and more particularly to database management systems.

2. Prior Art

Typically, today's enterprise or legacy systems store large quantities of data in database systems accessed by database management system (DBMS) software. In such database systems, data is logically organized into relations or tables wherein each relation can be viewed as a table where each row is a tuple and each column is a component of the relation designating an attribute. It has become quite common to use relational database management systems (RDMS) for enabling users to enter queries into the database in order to obtain or extract requested data. To extract desired data, the user enters a query derived from a database query language into the RDMS. One well known query language is SQL. The query language provides a set of commands for storing, retrieving and deleting data. Such language for relational database management systems does not require users to specify the manner in which data needs to be accessed. For additional information, reference may be made to the glossary included herein. Generally, a query optimizer component is included in the database management system to select the manner in which queries will be processed. That is, the query optimizer component analyzes how best to conduct the user's query of the database in terms of optimum speed in accessing the requested data.

As known in the art, to conserve space in the database, it becomes desirable that the stored data values not be unnecessarily duplicated. Therefore, in a relational database, instead of having one very large table to hold duplicate data values, the user generally creates several smaller tables that contain unique data values that are related to each other through common attributes. A user can retrieve data for a given set of criteria by "joining" the smaller tables to represent the large table. Data is extracted from the system using a query command which locates all rows in a table or tables that meet specified criteria. In such systems, one of the most expensive operations to conduct in terms of time and resources is the "join operation" which joins together two or more entire relations which can be fairly large. When multiple joins are present in a user generated query, as is the typical case, the cost of processing the query increases dramatically. Thus, the time expended in developing, optimizing and processing complex queries can be exceedingly costly in terms of time and resources. This is particularly true as more and more complex data types.

To improve system performance in executing programs that use SQL statements to access such databases, one approach has been the introduction of an SQL cache which makes it possible to reuse the results of having processed certain types of complex query statements. The approach has been to reuse the results of previously processed SQL statements. Generally, a SQL statement is processed by optimizer software which develops an access plan for executing the SQL statement in a manner that produces optimum performance. Executable code is then generated for executing the statement. Since this process is quite time consuming particularly in the case of complex query statements, the approach was to reuse previously generated executable code by storing the code in a local cache associated with the process (i.e., each program in execution) initiating the SQL queries.

The above approach has allowed the system in certain cases to bypass the step of code generation when the system encounters an identical SQL statement during the execution of a particular process. Since programs that access such database files repeatedly execute identical SQL statements, the use of an SQL cache with each process has been found to significantly improve performance. An example of a system that makes use of an SQL cache is the INTEREL product developed and marketed by Bull HN Information Systems Inc. For information concerning this product, reference may be made to the publication entitled, "Database Products INTEREL Reference Manual INTEREL Performance Guidelines, Copyright, 1996 by Bull HN Information Systems Inc., Order No. LZ93 Rev01B.

While the above approach has increased performance, it still takes considerable time to process complex statements in those instances where the particular process being run has not processed the same identical statement. Further, even if the process has previously processed the statement, the results of such processing are not saved when the process terminates. Hence, the same statement must again be processed when that same process is later run. Thus, the "local cache based" approach still is unable to address delays on a global basis.

Accordingly, it is a primary object of the present invention to provide a more efficient cache organization for improving system performance.

It is a further object of the present invention to provide a more extensive and flexible approach in processing complex statements.

It is still a further object to provide a more efficient way of managing memory resources during the processing of information queries.

SUMMARY OF THE INVENTION

The above objects are achieved in a preferred embodiment of the present invention in which a host system includes a multilevel cache system within the host system's memory that includes one local cache memory per process accessing host system databases and a central cache system shareable among the processes. In the preferred embodiment, the central cache system includes a control mechanism, a number of shared central cache control structures and a number of sets of control structures, one set for each central cache configured within the central cache system for accessing code segments associated therewith. Each set of control structures is user accessible via a set of utility directives through the shared central cache control structures. The shared central cache control structures include a first control table structure in the form of a directory containing entries which define the central cache memories configured for use by the system and references to associated set of control structures used in operating each configured central cache.

In the preferred embodiment, a utility is run to create individual caches within the central cache system. During operation, the process's local cache and central cache system operate cooperatively in processing complex database query statements. For example, in the case of a first process being executed, code is generated for each complex statement processed and stored in both the process's local cache and in the central cache associated with the process. Code generation and caching continues until all of the unique statements have been processed at which time the system is deemed to be in a steady state condition. The time required to reach steady state is referred to as "ramp-up" time. After code has been generated, the first process can now execute statements stored in its local cache without further code generation. Other subsequently executed processes configured to use the same central cache as the first process that are required to process complex statements identical to those processed by the first such process can use the previously generated code stored in the central cache. That is, when one of the processes first encounters a complex database statement, a search is made in local cache. If the appropriate code is found, the process executes that code. If the appropriate code is not found, then the system searches the central cache configured to be used by the process. If the code is found to be in the central cache, the central cache system moves a copy of the previously generated code to that process's local cache and converts the generated code into an executable form which the process can then execute out of its local cache.

When the first process terminates, the process's local cache is discarded while the central cache operates indefinitely until deleted bet the system using the set of utility directives. By enabling processes to share code generated by other processes even after such processes have been terminated, the multicache system of the present invention improves overall system performance. Further, the present invention enables new central caches to be created or deleted as required for optimizing performance as a function of the type of applications being executed and their requirements.

The above objects and advantages of the present invention will be better understood from the following description when taken in conjunction with the accompanying drawings.

BRIEF DESCRIPTION OF THE DRAWINGS

FIG. 6 is illustrates the different interfaces used by the multilevel cache system organization of the present invention.

DESCRIPTION OF THE PREFERRED EMBODIMENT

FIG. 1

Figure 1:
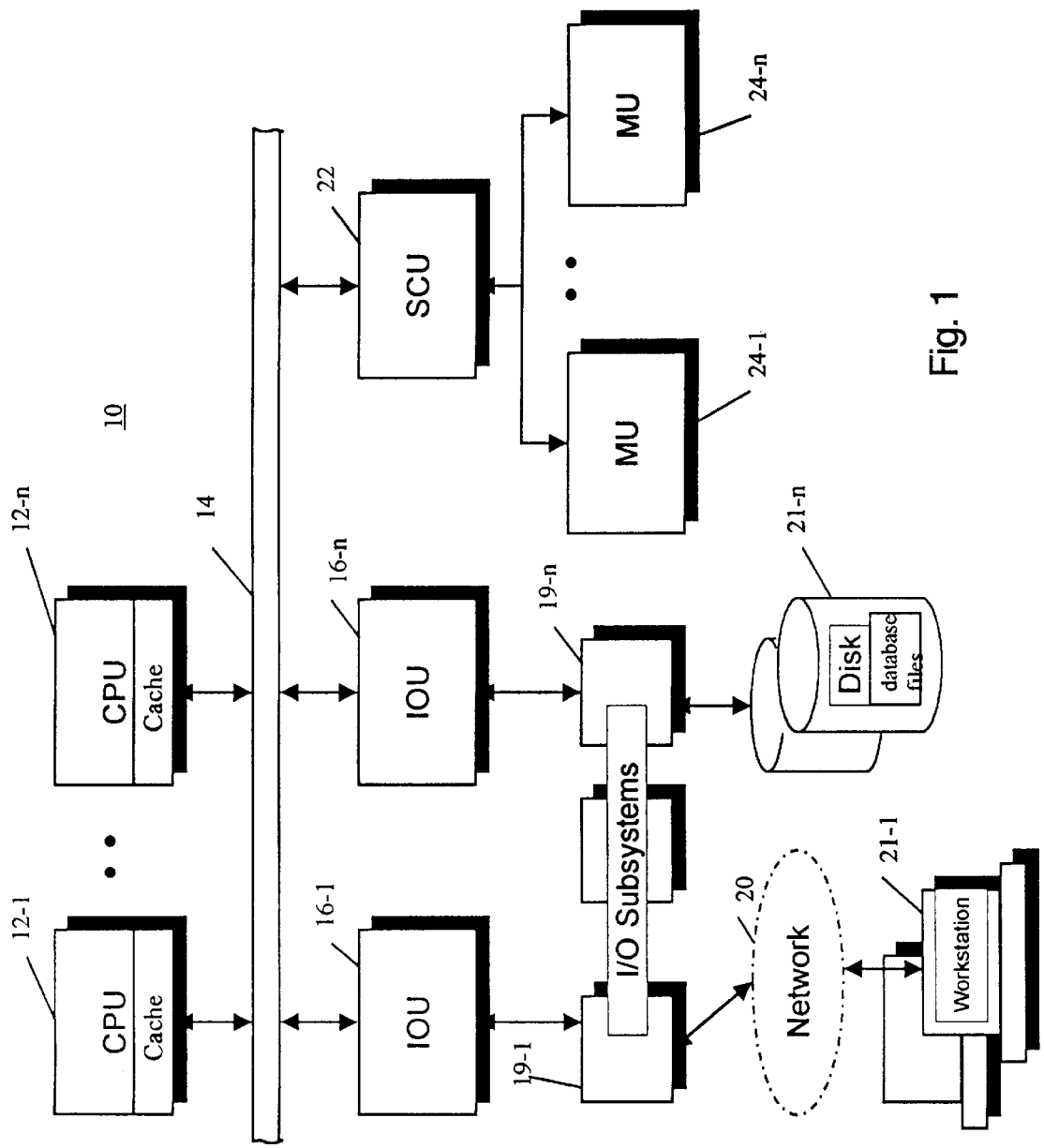
FIG. 1 is an overall block diagram of a data processing system that utilizes the teachings of the present invention.

FIG. 1 is a block diagram of a conventional data processing system 10 that utilizes the multicache organization of the present invention. As shown, the system 10 includes a plurality of processing units 12-1 through 12-n which connect to a system bus 14 through their individual physical caches in common with a number of input/output units (IOUs) 16-1 through 16-n and a system control unit (SCU) 22. As shown, each IOU couples to a particular I/O subsystem (i.e., 19-1 through 19-n) which in turn connect to any one of a number of different types of devices both local and remote such as workstations 21-1 via a network 20 or disk mass storage units 21-n as indicated.

The SCU 22 connects to a number of memory units (MUs) 24-1 through 24-n. For the purpose of the present invention, system 10 may be considered convention in design and may for example utilize a mainframe computer system such as the DPS9000 manufactured by Bull HN Information Systems Inc. which operates under the control of the GCOS8 operating system. In this system configuration, users may wish to access the files of a large relational database stored on disk storage 21-n via the network 20 by entering SQL database queries via their workstation keyboard and/or via other input devices (e.g. mouse). The system 10 upon receiving the SQL query operates to initiate a search of the database files to obtain the data requested by the user. In system 10, all user SQL queries are presented to a relational application manager which forms part of a relational database management system such as INTEREL software which runs under the GCOS8 operating system. The INTEREL software further includes a host based relational file manager (RFM) software for accessing the database files and an Operational Directory Interface (ODI) used for the storage of directory information. These components are described in greater detail in the publication entitled, Bull Users Society Fall Conference Proceedings, Copyright, 1991 by Bull HN Information Systems Inc. These components are discussed herein only to the extent required for an understanding of the operational environment in which the multicache system of the present invention operates.

Figure 2:
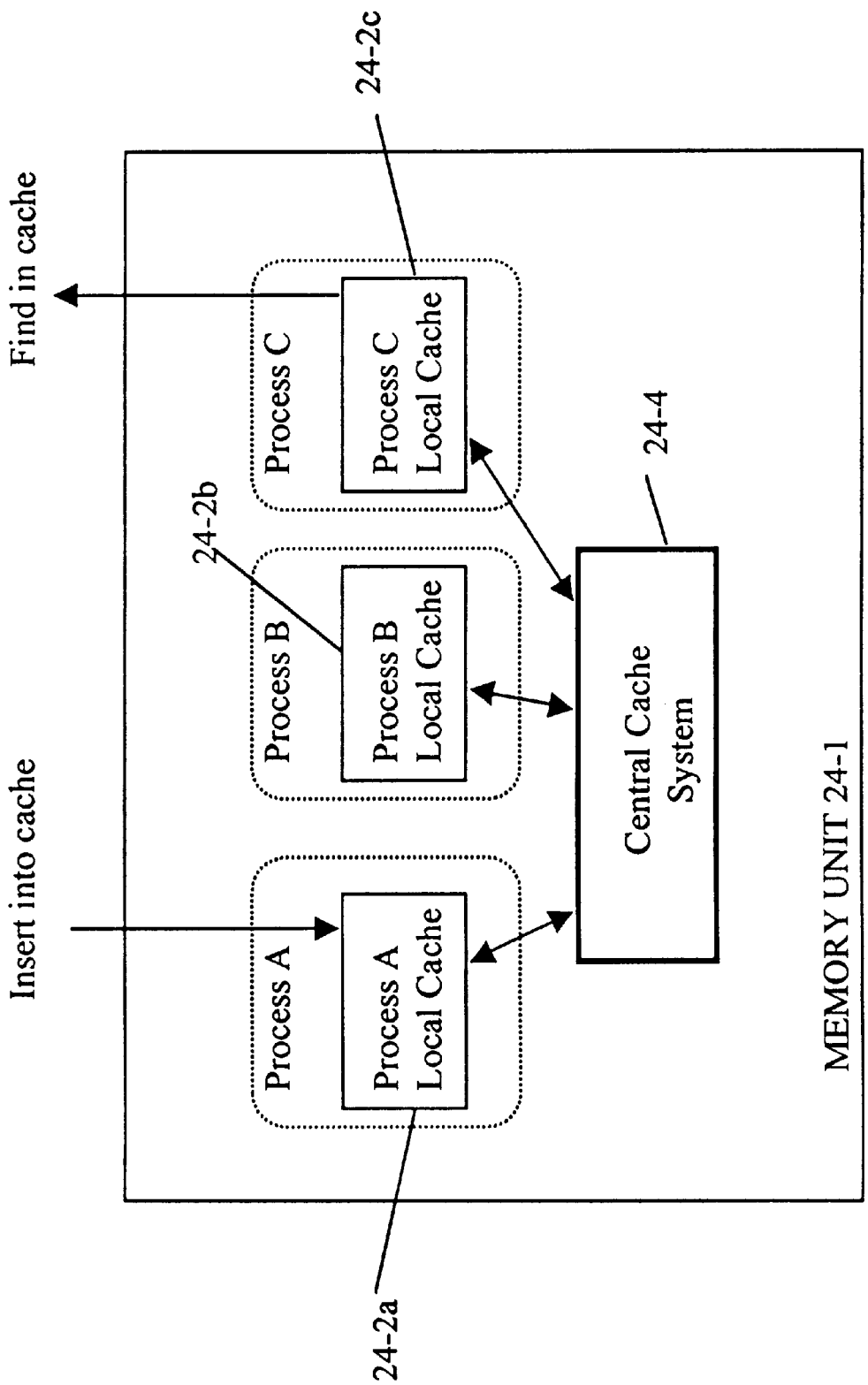
FIG. 2 is a block diagram illustrating the multilevel cache system organization according to the teachings of the present invention.

FIG. 2—Multicache Organization

FIG. 2 depicts the organization of the multicache system of the present invention. For ease of illustration, a single memory unit 24-1 is shown. It is assumed that there are three processes (A, B, and C) being executed and that specific areas of memory unit 24-1 have been allocated to each process. These memory areas correspond to the local cache blocks 24-2a through 24-2c in FIG. 2. Additionally, another area of memory unit 24-1 has been allocated to be shared among the processes. This memory area corresponds to central cache block 24-4 in FIG. 2. As explained herein, the multi-level cache system of the present invention is made up of one or more Process-Local Caches and a central cache system containing at least one Central Cache. As diagrammatically indicated by the dotted lines in FIG. 2, the process-local cache is dedicated to the specific process for which it is created. In a conventional manner, the RDMS (INTEREL software) automatically creates a process-local cache for each process that accesses relational database files stored on disk 21-n and allocates memory for code segments generated during process execution. In the example shown, the central cache system is to be shared by the multiple processes A, B, and C. Through the use of utility directives, an administrator specifies the configuration parameters for each central cache within the central cache system and creates each cache explicitly as described herein. When the central cache is so configured, configuration parameters can be used to specify whether processes A, B and C will use a central cache and which central cache will be used by such processes. As indicated by the solid lines between each local cache and central cache system 24-4, it is assumed that all three local caches are specified to use the same central cache within the cache system 24-4.

Figure 3:
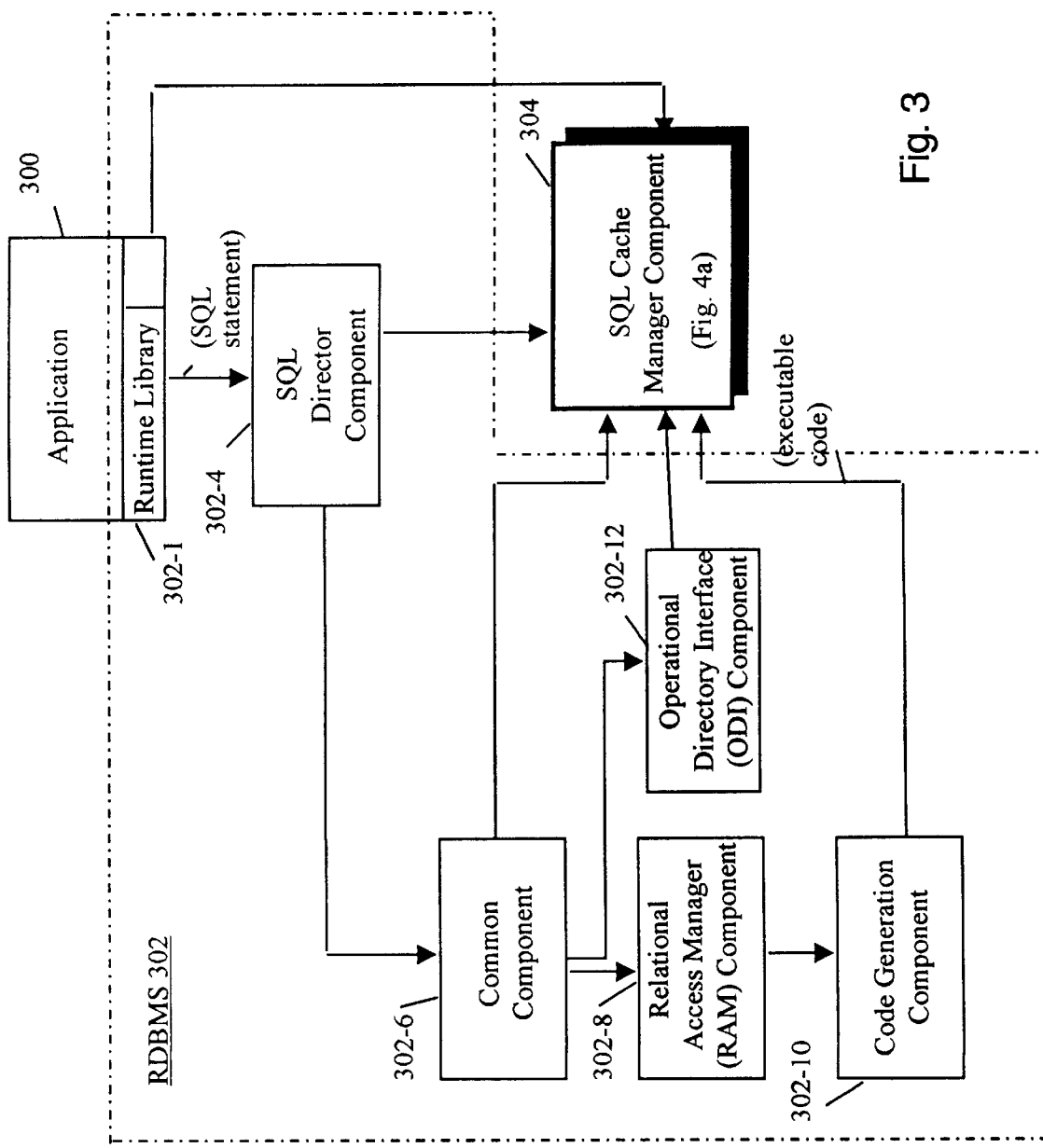
FIG. 3 is a block diagram illustrating major components of a database system which incorporates the multilevel cache system.

FIG. 3 Database System Components

FIG. 3 illustrates in block diagram form, the major components of the preferred embodiment involved in processing database query statements. As shown, these components include the components of RDMS 302 (INTEREL software) and a SQL cache manager component that manages both local and central cache systems as described herein. In greater detail, RDMS 302 comprise a Runtime Library 302-1 which serves as the application's interface to the RDMS 302, a SQL Director Component 302-4, a Common Component 302-6, a Relational Access Manager (RAM) component 302-8, a Code Generation component 302-10 which contains support routines for acquiring information stored in a number of "Code Generation" structures relating to code which has been generated and an Operational Directory Interface (ODI) component 302-12 arranged as shown.

The Runtime library 302-1 contains runtime routines bound into the application used by the application 300 for issuing calls. Each such call results in library 302-1 sending a query statement to Director component 302-4. The Director component 302-4 contains routines which analyze each query statement for determining if the statement is of a type that accesses relational database files and thus is suitable for code generation and storage in the process's local cache. The Director component also contains routines that generate calls to Cache Manager component 304 to see if the code for that statement can be found in the process's local cache or in any central cache associated therewith. When code for that statement is not found in either cache, the Director component 302-4 calls the Relational Access Manager 302-8 via the Common component 302-6 to process and "potentially" execute the query statement as described herein.

Also, as indicated, there is a path provided which enables the Common component 302-6 to call the ODI component 302-12 to delete obsolete code through the SQL Cache Manager component 304. Lastly, the Common component 302-6 also directly communicates calls to the SQL Cache Manager component 304 when deleting obsolete code. The path taken to delete obsolete code depends upon the particular operation that is triggering the deletion.

Figure 4A:
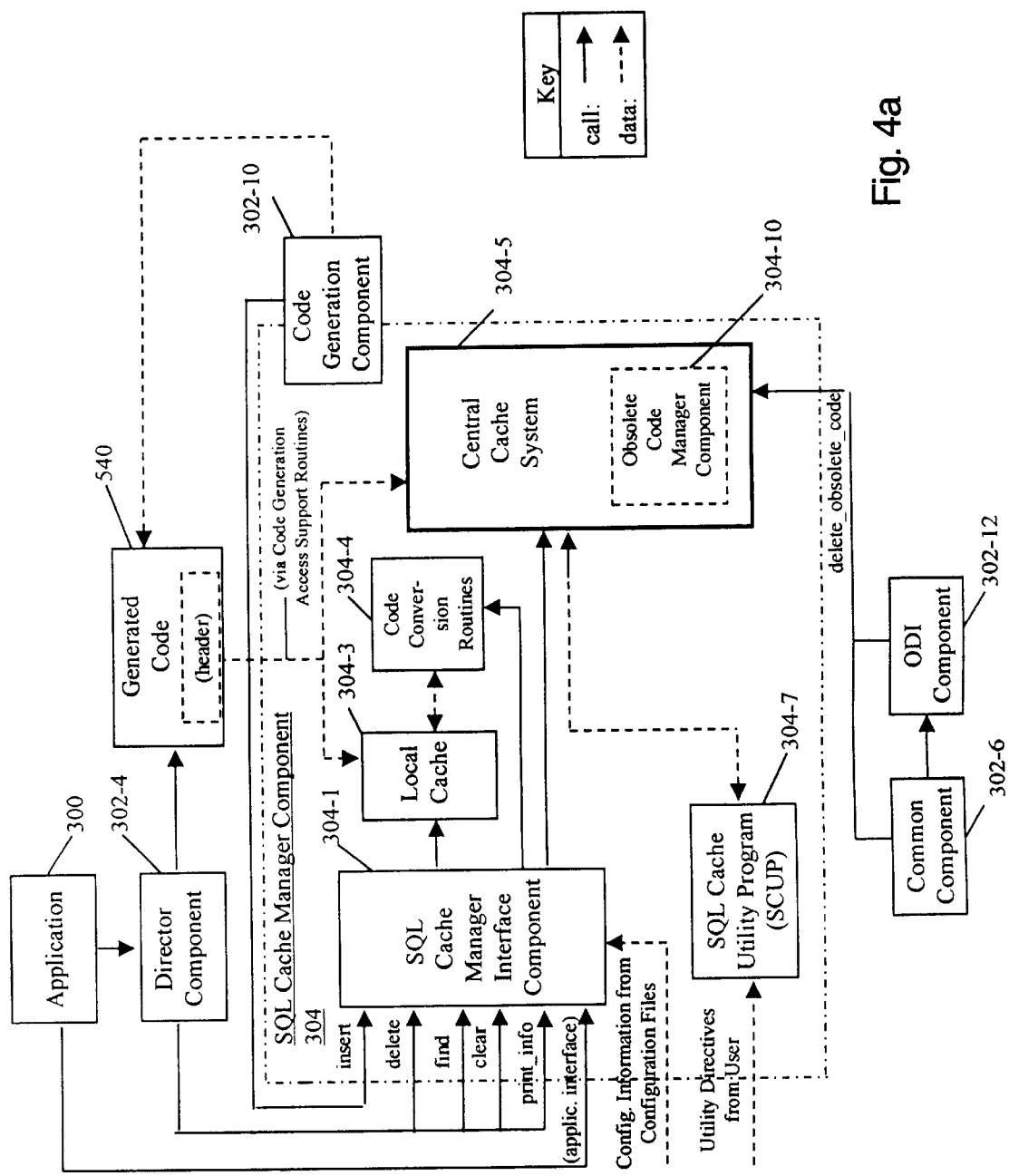
FIG. 4a is a block diagram illustrating the components of FIG. 3 in greater detail.

FIG. 4a–SQL Cache Manager Components

FIG. 4a shows in greater detail, the components that comprise the SQL Cache Manager component 304 of FIG. 3. The Cache Manager component 304 includes a number of routines for performing services involving cache entries associated with the central and local caches. Hence, the Director component does not differentiate between central and local cache; the component views them simply as "the cache".

As shown, the Cache Manager component 304 includes an internal programmable interface component 304-1, a local cache component 304-3, a central cache component 304-5, a SQL Cache Utility Program (SCUP) 304-7 and an Obsolete Code Management (OCM) component 304-10, all of which are operatively coupled as shown.

The programmatic interface component 304-1 serves as the interface to both central and local cache components and is called by the Director component 302-4 to perform a number of internal operations as indicated in FIG. 4a. As shown, these operations correspond to find, delete, clear, insert and print-info requests used to access the contents of the cache. The internal programmatic interface commands/requests will be discussed in greater detail with reference to FIG. 6.

The local cache component 304-3 and central cache component 304-5 each includes a search logic mechanism and associated control structures described in greater detail herein required for carrying out the processing of requests received from SQL Director component 302-4 via SQL Cache Manager Interface component 304-1. The local cache component 304-3 manages the storage of generated code within process-local memory while central cache component 304-5 manages the storage of generated code within the portion(s) of memory shared by multiple processes.

As shown in FIG. 4a, both caches 304-3 and 304-5 operatively couple to Code Generation component 302-10 for receiving generated code header information of code segments 540 for use within their respective search logic mechanisms. The Code Generation routines that support movement and conversion include: a Centralize Code routine which is called by the Cache Manager component to prepare a specific piece of generated code for movement from the local cache system to the central cache system, and a Localize Code routine used to prepare a specific piece of generated code from the central cache system for movement to the local cache system. The Centralize Code routine performs the operations of marking the code as not directly executable, storing information in the code header and preparing a checksum or similar verification. The Localize Code routine performs the operations of resolving process-relative address references, marking the code as executable, and calling for the insertion of the code into the local cache system.

Additionally, central cache component 304-5 couples to SQL cache utility program (SCUP) component 304-7. The SCUP component 304-7 is a batch program used for carrying out a number of functions pertaining to the central cache component 304-5 in response to a set of utility directives applied via its interface with the central cache system 304-5. This interface will be described in greater detail with reference to FIG. 6. Also, the central cache component 304-5 operatively couples to the OCM component 304-10.

As in the prior art discussed above, the local cache component 304-3 processes cache entries represented by L-nodes. Each L-node contains information related to one block of generated code. Some of the information is stored in the L-node while other information is merely pointed to by the L-node. For example, the generated code is not located in the L-node but a pointer to the code is stored in the L-node. Active L-nodes are linked into lists. A first set of lists is based on a hash value with each list containing L-nodes associated with a particular hash value. All L-nodes are also linked into a second list called a most recently used (MRU) list. This results in each L-node that is in used to be linked to two lists, a particular hash bucket list and the MRU list. The L-nodes not in use are linked at the end of the MRU list.

When a new L-node is to be inserted into cache, it is placed at the head of the appropriate hash bucket list and linked at the head of the MRU list. Both types of lists are doubly linked lists to allow for simple removal of entries or in the case of the MRU list, to allow for reordering. When an existing L-node in cache is accessed for use of the generated code, it is relinked to the head of the MRU list.

Once local cache is full, each new entry causes the deletion of the least recently used entry, along with the associated generated code and the allocated memory is reused for the storage of the new entry.

Each L-node contains the following type of information fields: fields containing "next" and "previous" links to nodes in the same bucket; fields containing "next" and "previous" links to nodes in the MRU list, a code token field used to reference and call a piece of generated code; a model token field used to differentiate models in use by the process; the number of host variables; a SQL command type field and a size field for specifying the number of words of generated code. For further information regarding the use of L node structures, reference may be made to Appendix VI.

In the preferred embodiment, each central cache entry is represented by a C-node structure. As in the case of the local cache, the central cache system uses a bucket mechanism and a MRU list. The number of an available entries, as well as the number of buckets are not necessarily the same for the local and central cache systems. C-nodes differ somewhat in content from L-nodes, but share certain components such as those that link nodes to each other both within the same bucket and within their respective MRU chains. In contrast to L-nodes, a C-node does not contain a code token or a model token field. Instead of a code token field (which is a domain relative data type in the L-node), the central cache system has a list of descriptors that are indexed in parallel with the array of C-nodes. Each descriptor frames a segment of memory in the shared workspace that contains the associated code. The model token field in an L-node is used for storing a process relative value that cannot be used in the central cache system. Identification of the tables referenced by the generated code in the central cache system, qualified by owner and model are included with the generated code and are accessed by the central cache system through code generation data access macros. Additionally, there are a number of other structures that are used by the central cache system. These will be discussed in connection with FIG. 5.

The Cache Manager component calls routines in the Code Generation component 302-10 and provides a code "token" as an input which is interpreted as a pointer to a generated code segment or to a data structure that contains the pointer to the code segment. For further information regarding these routines, reference may be made to Appendix II.

Figure 4B:
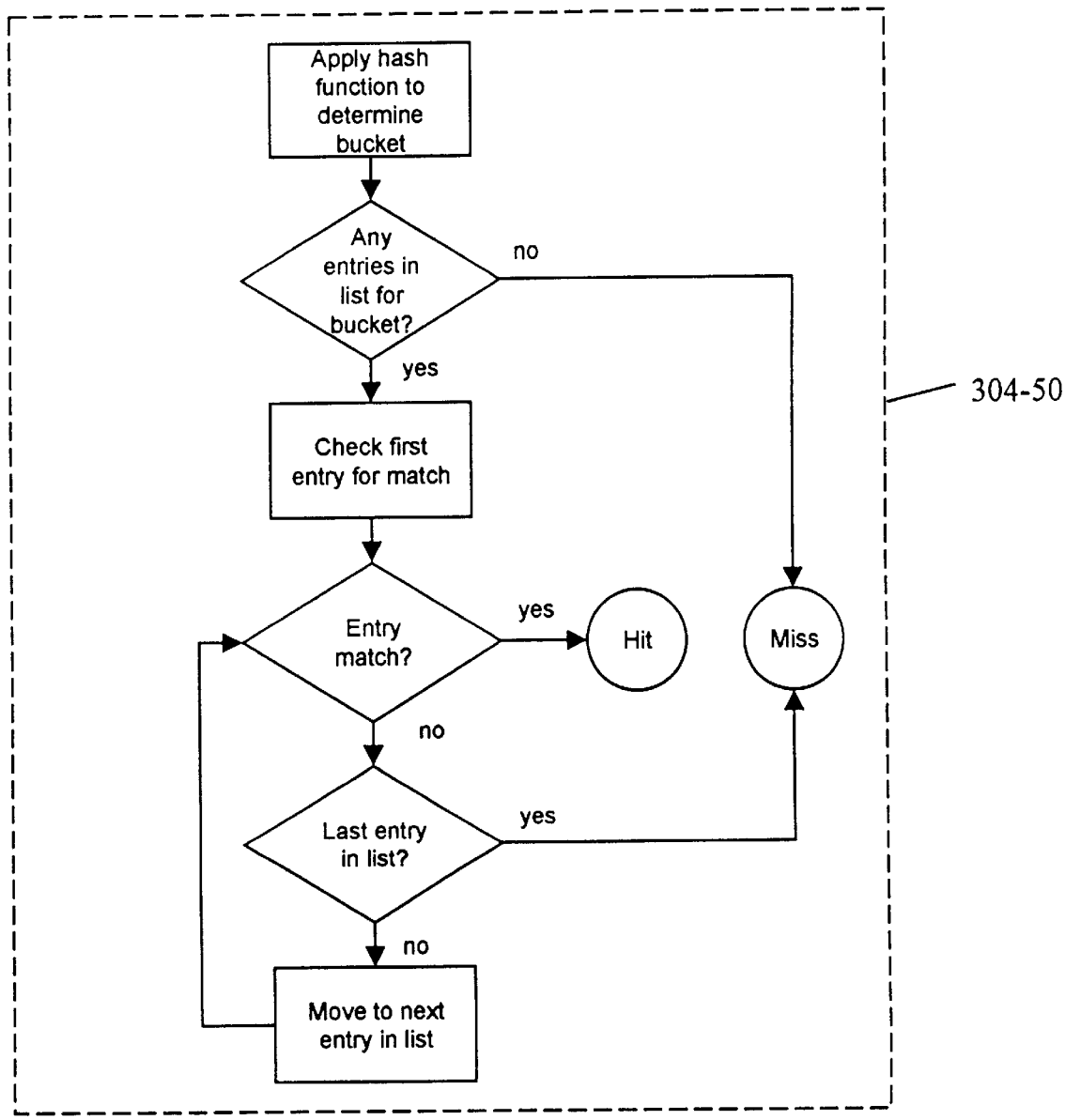
FIG. 4b illustrates the operational flow of the search mechanism of the central cache system of FIG. 3.

Search Mechanism–FIG. 4b

FIG. 4b illustrates the operational flow of the central cache search mechanism 304-50. This mechanism is similar in operation to the search that occurs in the local cache. As indicated in FIG. 4b, the search mechanism 304-50 utilizes a hash method of function in order to handle searches involving thousands of potential entries to be searched. The hash method also allows use of the results of the calculation already done by the local cache to be used for the central cache search.

The hash function takes, as input, the properties of the SQL statement such as the normalized SQL statement length and text, the number, type and length of host variables, the use of indicator variables and the name of the cursor, if any. The hash function involves calculating the checksum of these items or values representing these items to provide a "hash intermediate value". This value is divided by the number of buckets (i.e., a prime number) and the remainder of the result is used to determine the bucket. It will be appreciated that other algorithms could be used to calculate the hash function.

The hash intermediate value is calculated during the search of the local cache. If the central cache system must also be searched as for example, during the execution of a find function in which the search of the local cache results in a miss, the hash intermediate value is passed on to the central cache system so that the checksum portion of the calculation need not be repeated. The division operation to obtain the remainder is performed separately in the local and central cache systems since the number of buckets in each most likely will differ.

The search mechanism compares the entries in the calculated bucket list until it detects a match which it signals a hit or until all of the entries in the list have been examined in which case, it signals a miss. When traversing a bucket list comparing entries for a hit, the central cache system uses as the criteria for a hit, identical matches of the following items: cursor name if any; statement type; host variable number, type and length if any; statement text; secondary text (i.e., the SELECT text associated with a FETCH statement); owner name; model name; and executing user id name.

The bucket lists are double-linked lists to allow simple removal of entries that are not at either end of the list. The number of buckets used is equal to the prime number less than or equal to the configured maximum number of cache entries. With a reasonable distribution across the buckets, the number of entry match comparisons can be kept to a minimum. It will be appreciated that the number of buckets could also be a user configurable number.

Figure 4C:
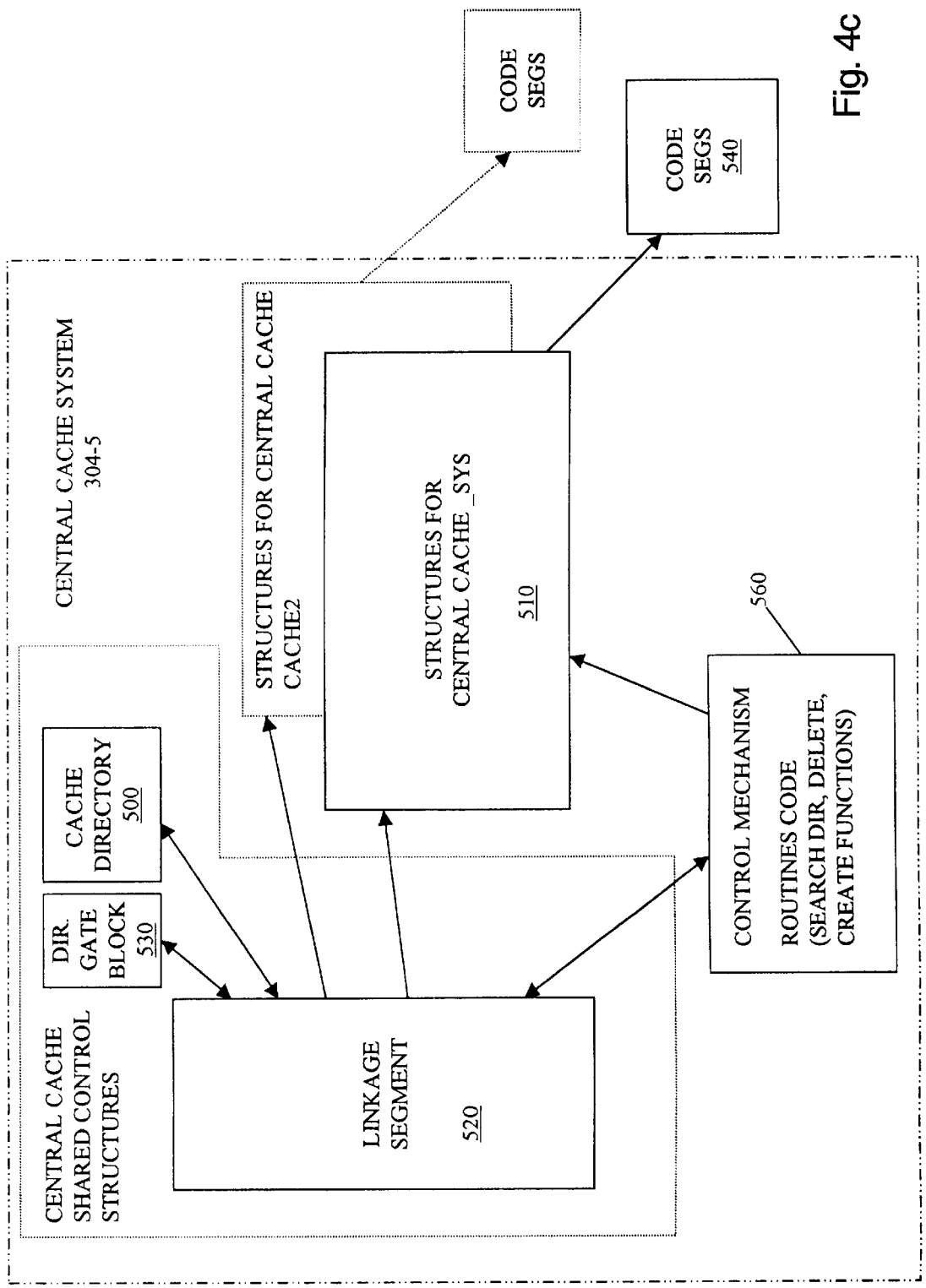
FIG. 4c illustrates the overall organization of the central cache system of FIG. 3.

FIG. 4c—Central Cache System Organization

FIG. 4c illustrates in greater detail, the overall organization of the central cache system 304-5 of FIG. 4a. As indicated, the system 304-5 includes a number of shared control structures 500, 520 and 530, a control mechanism 560 and a set of control structures 510 for each central cache configured in the system. The cache directory structure 500 is a structure used for indicating which central caches have been configured within the system.

The linkage segment 520 is a system memory segment that contains all of the descriptors (segment and entry) that define a domain (see glossary). These descriptors are created by a linker program prior to execution or by the operating system during execution. For further information regarding the use of such segments, reference may be made to U.S. Pat. No. 4,300,192 that issued on Nov. 10, 1981.

The directory gate block structure 530 is a structure used for controlling access to cache directory 500 through a queue monitor mechanism which is used to manage the cache directory 500 resource. For the purposes of the present invention, the queue monitor mechanism may be considered conventional in design. For example, the queue monitor mechanism may take the form of the monitor mechanism described in the text entitled, "Operating Systems Advanced Concepts" by Mamoru Maekawa, Arthur Oldehoeft and Rodney Oldehoeil, Copyright 1987 by The Benjamin/Cummings Publishing Company, Inc., at pages 57–59.

The control mechanism 560 includes the various routines that are used to create, modify and access the central cache control structures through linkage segment 520. These routines will be described in conjunction with FIGS. 8a through 8d.

Figure 5:
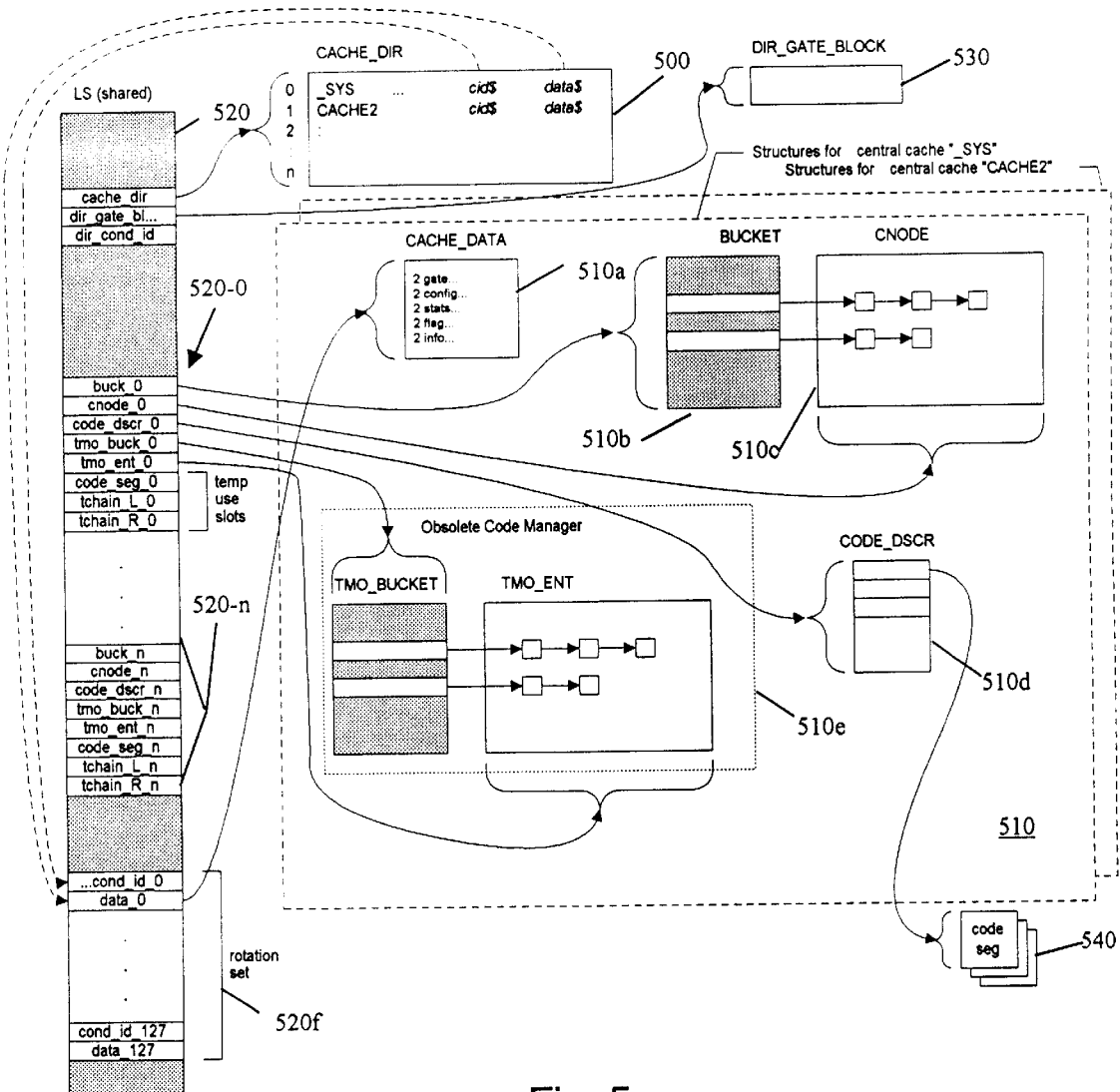
FIG. 5 illustrates in greater detail, the control data structures utilized by the central cache system organization of the present invention.

FIG. 5—Control Structures

FIG. 5 illustrates in greater detail, the different sets of control structures included in the central cache system of FIG. 4c. As shown, the linkage segment 520 includes a number segments 0 through n for storing a corresponding number of sets of descriptors labeled as 520-0 through 520-n. Additionally, as shown, linkage segment 520 provides storage for a cache directory descriptor, cache_dir, a directory gate block descriptor, dir_gate_b1 and a directory condition ID descriptor, dir_cond_id. These descriptors provide values for accessing information and the structures 500 and 530 as indicated.

As shown, the central cache directory 500 includes entries identifying each central cache which has been previously configured in the system using the cache utility commands described in Appendix III. As indicated, the CACHE_DIR structure 500 takes the form of a table structure having n number of entry storage locations for storing a corresponding number of data entries. Each table data entry defines a particular central cache being used by the system. By way of example, the CACHE_DIR control structure 500 is shown as containing two data entries in locations 0 and 1. The first data entry is coded to specify that a first central cache named "_SYS" has been configured by the system. As explained herein in greater detail, configuration is carried out through the use of a create_central_cache command described in Appendix III and discussed herein. The second data entry specifies that a second central cache named "CACHE2" has also been configured by the system.

As shown in FIG. 5, both data entries contain the two additional fields cid$ and data$. These fields serve as pointers to a pair of memory addresses contained within linkage segment 520. By storing central cache structures in linkage segment 520, this ensures that such structures remain or persist in memory for a sufficiently long period of time (e.g. days, weeks etc. or until the system shuts down).

Also, the directory control structure 500 establishes an index value for accessing the further group of control structures 510 which define the different components/structures required for operating the corresponding central cache. As shown in FIG. 5, these components include a cache data component structure 510a, a bucket component structure 510b, a CNODE component structure 510c and a code descriptor component structure 510d. An additional group of structures 510e may also be included for utilization by the obsolete code manager component 304-10 of FIG. 4a when that capability has been included within the multicache system of the present invention.

As indicated in FIG. 5, the each of the sets of central cache structures are accessed through the particular set of descriptors indexed using a cache index value which is mapped to the address of the central cache name stored in CACHE_DIR structure 500. Stated differently, the CACHE_DIR entry location associated with the name of the particular central cache serves as the index value used by the system (i.e., control mechanism 560) to locate the set of descriptors associated therewith. Thus, the central cache named _SYS is mapped to the index value of zero which identifies the set of descriptors 520-0 of descriptor segment "0" as being associated therewith. The central cache named CACHE2 is mapped to the index value of one while a central cache name stored in CACHE_DIR entry location n would be mapped to the index value of n which identifies the set of descriptors 520-n of segment descriptor "n" of FIG. 5. As indicated in FIG. 5, each segment descriptor specifies the location of the structures for a particular central cache, including the bucket structures, the CNODE structures, and the code segment descriptor list.

As indicated in FIG. 5, there is another set of descriptors that is maintained for each central cache and stored in a different area of the linkage segment 520. These descriptors are used in conjunction with the queue monitor mechanisms that are used to implement exclusive access to the structures of each central cache. This set of descriptors is referred to as a rotation set 520f in FIG. 5. Two descriptors of this set are allocated for each central cache. They are kept separate from the descriptors described above since they need to exist for a while after the associated central cache is deleted. This extra time allows for straggling processes that have completed exclusive access to the CACHE_DIR, (so they believe that the desired central cache still exists), but are waiting for exclusive access to the structures for the specific central cache (i.e., those structures which may have been deleted in the meantime). With the exclusive access mechanism descriptors stored separate from the descriptors that specify the other structures of each central cache, the straggling processes can detect that the cache has been deleted and return status accordingly.

The pairs of descriptors in the rotation set are allocated sequentially as caches are created. References to each pair in use are stored in the CACHE_DIR 500 and are represented as cid$ and data$. When the end of the rotation set is reached, reallocation resumes at the start of the rotation set. The rotation set can support four times as many central caches as can be active at one time. This allows sufficient time for the straggler processes mentioned above to recognize the deletion of the cache they are attempting to access if such deletion has occurred.

For each central cache that is created, one of the two descriptors allocated in the rotation set is used to describe a shared area of memory. One part of that shared area of memory is used for exclusive access counts and signaling. This area also contains configuration and statistical information relating to the associated central cache. The other descriptor is used directly by the exclusive access mechanism.

Considering the structures 510 in greater detail, it is seen that the CACHE_DATA structure 510a describes the basic characteristics of its central cache system. As indicated in FIG. 5, the structure 510a includes a number of different sections labeled gate, config, stats, flag and info. The gate section which provides protection is used for storing identification information values used to enforce exclusive access to the particular central cache system. The config section is used for storing configuration related information values such as maximum number of buckets, maximum number of entries, maximum memory etc. As indicated earlier, these values are configured using the create central cache command of Appendix III.

The stats section is used for storing statistical information values obtained during the operation of the central cache system associated therewith. The flag section is used for storing informational flag values set during central cache operation while the info section is used for storing other informational values.

The bucket structure 510b is used for storing bucket information values such as head pointer, tail pointer and count. The CNODE structure 510c is used for storing node information values such as node link pointers for traversing the CNODE structure, number of words in code, command type, host variables, bucket identifier, etc. The code descriptor structure 510d is used for storing code descriptor information relative to identifying the location of a code segment. Examples of these different control structures are shown in Appendix VI.

Central Cache Interfaces—FIG. 6

FIG. 6 illustrates the different interfaces utilized with the central cache system 304-5. As shown, there are four separate paths or interfaces associated with the central cache system 304-5. These correspond to the internal programmable interface of FIG. 4, the utility directive interface used by the cache utility program component 304-7 of FIG. 4, a configuration interface and an application visible interface. As previously, discussed, the internal programmable interface is an interface utilized by the Director component 302-4 to have various services performed by the central cache system 304-5 initiated by requests received from the application 300.

In greater detail, cache manager component 304 in response to a Find Entry request initiated by a routine call received from the Director component 302-4, searches local cache component 304-3 for a statement matching the current one and if found, causes the execution of the generated code. In response to a Delete Entry request, the Cache Manager component 304 operates to remove an entry from the local cache component 304-3 and in response to a Clear Cache request clears the local cache component 304-3 (during disconnect processing). Also, when the Code Generator component 302-10 calls the Cache Manager component 304 to perform an Insert Entry logical operation, the Cache Manager component 304 operates to register a code fragment in the local cache component 304-3. If the cache is full, the inserting of an entry operation causes another entry to be deleted from the local cache component 304-3. Lastly, in response to a Print Info request, the Cache Manager component 304 causes a printout of summary cache information.

The utility directive interface is used by the SCUP component 304-7 to create a central cache system and define its basic characteristics, to delete a central cache system, to manipulate selected entries in a central cache system and to acquire information regarding the contents of central cache system to develop statistical information. The central cache utility directives have a particular syntax and a set of representative directive commands is shown in Appendix III.

The configuration interface is used by a database or system administrator to manage the usage of the central cache system 304-5. More specifically, the interface can be used as follows:

(a) to specify the configuration parameters to be associated with central cache system 304-5;

(b) to specify whether specific user IDs and/or processes will use and update central cache system 304-5; and, (c) to tune cache performance by adjusting variables such as configuration parameters based experience gained during system operation.

The manner of specifying cache configuration parameters and the structure of these parameters is described in Appendix IV.

The application visible interface is used by the application 300 to call various routines contained with the support library 302-1 of RDMS 302 which relate to the generation of statistics, the clearing of certain statistical counters, and the clearing of the local cache. This interface can only be used to access a single central cache system specified by the application 300 or process associated therewith. The particular central cache to be accessed with the interface is specified using the configuration parameters provided via the configuration interface. The calls provided by the interface are described in Appendix V.

DESCRIPTION OF OPERATION

Figure 7A:
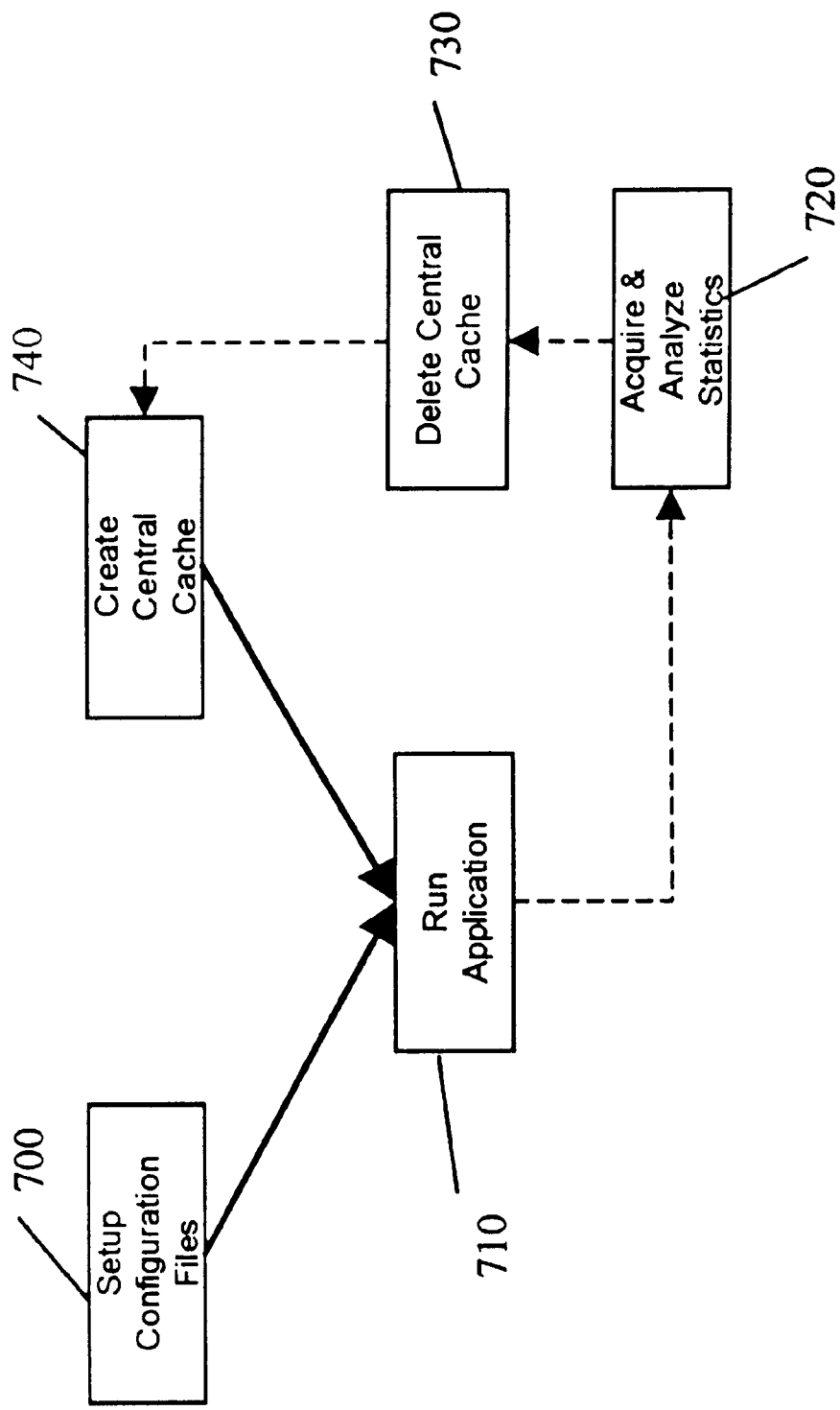
FIG. 7a illustrates the administrative flow utilized by the multilevel cache system organization of the present invention.
Figure 7B:
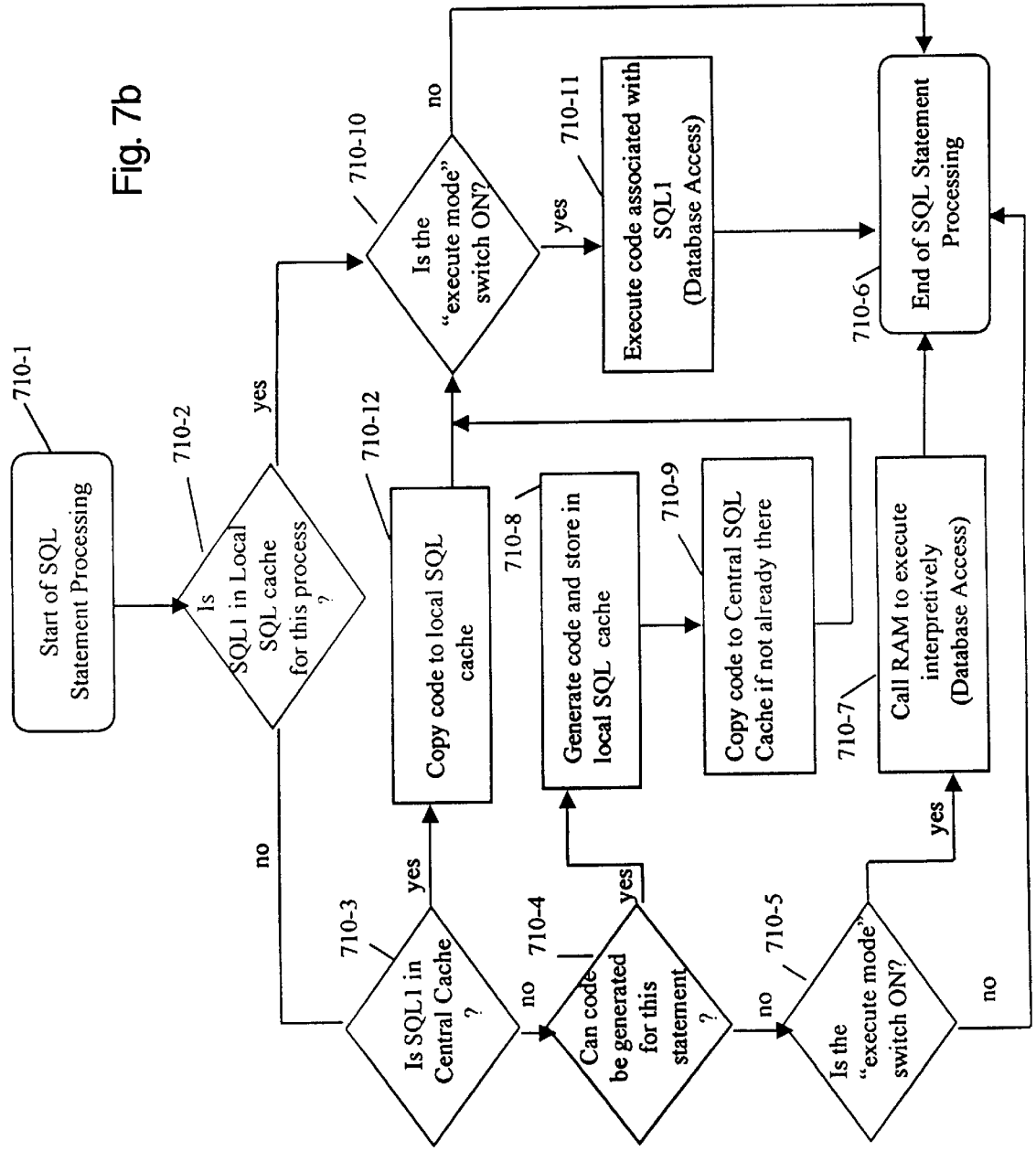
FIG. 7b is a flow diagram illustrating the interaction between central and local cache in processing SQL statements according to the teachings of the present invention.

With reference to FIGS. 1 through 6, the operation of the control mechanism constructed according to the present invention will now be described in conjunction with the flow charts of FIGS. 7a, 7b, and 8a through 8d. FIG. 7a illustrates the overall administrative operation of the multicache system of the present invention in the system of FIG. 1. FIG. 7b illustrates the interaction between the local and central caches in processing SQL statements.

As indicated in block 700 of FIG. 7a, initially the configuration files are setup by an administrator. When the application is run, the RDBMS software loads the contents of the configuration files into the appropriate memory areas. If there are no configuration parameters specified, then the system uses established default values.

Since the particular method of configuration is not pertinent to an understanding of the present invention, it is assumed that the setup procedure of block 700 has been performed. That is, the sizes of the local caches 24-2a through 24-2c have been configured utilizing the parameters of Appendix IV. Also, it will be assumed that the appropriate directives have been issued to configure each central cache system to be utilized within the system and its basic characteristics. This results in the appropriate information being stored within each of the control structures of FIG. 5 such that a central cache of central cache system 24-4 of FIG. 2 will have been created and configured to be shared among the processes in the manner described relative to FIG. 2. As indicated in block 710, after the execution of block 700, the RDBMS software is able to run processes A, B and C which are started in a conventional manner as indicated in FIG. 7b.

As indicated in block 720 of FIG. 7a, during execution, the application or process using the central cache system is able to report statistical information. This is accomplished through the application visible interface of Appendix V. Through the use of a X_SQL_CACHE_GEN_CENTRAL_REPORT call, the process can access the accumulated statistical information stored in the CACHE_DATA structure and display/generate statistics reflecting the use of the central cache system. Also, the user can issue a LIST_STATISTICS command via the utility directive interface as described in Appendix III to display the statistics pertaining to any existing central cache.

In the present example, process A, B or C can issue such calls via the application visible interface. In the present example, it is assumed that only one central cache system has been configured within the system of FIG. 1. The results of analyzing such statistical data can cause various configuration scenarios to can take place for the purpose of improving system performance. As indicated by blocks 730 and 740, the scenarios may also involve invoking SCUP component 304-7 of FIG. 4a using the delete and create cache utility commands of Appendix III. This use of such commands/directives will be discussed in greater detail with reference to FIGS. 8a through 8d.

Before considering the possible configuration scenarios, the manner in which the local and central caches interact in processing SQI, statements will be discussed with reference to FIG. 7b.

FIG. 7b

As indicated in block 1 of FIG. 7b, a program corresponding to process A of FIG. 2 (e.g. written in COBOL or some other language) is running in system 10 of FIG. 1 and somewhere in its execution flow of operation encounters a SQL statement labeled SQL1 wherein it enters the flow of FIG. 7b. It processes that SQL statement, analyzes it to some degree and searches local cache 24-2a to see if the code for that statement has already been generated as indicated in block 710-2. If there is no appropriate code in the local cache 24-2a (i.e., the No path), then process A searches to see if there is appropriate code stored in central cache system 24-4 as indicated in block 710-3.

There are several things that could happen which would cause the miss to occur in local cache 24-2a. One is that the amount of available space in local cache 24-2a was such that the SQL1 statement had to be replaced. In terms of the ramp-up type of situation, it could be that process A is a new process that has just begun execution and that this is the first time that process A encountered this SQL statement. At this point, the system now searches in central cache system 244 to see if any other process (i.e., process B or C) has encountered the SQL1 statement.

In the beginning of operation, there is no generated code stored in any of the caches in memory unit 24-1. Thus, when the system searches local cache 24-2a, it does not find the statement. Next, as indicated in block 710-3, the system searches central cache system 24-4 and again finds that the generated code is not stored in central cache system 24-4. As indicated in block 710-4, next, the system determines if it can generate code for the particular statement. If the answer is no, then the system interpretatively executes the same SQL1 statement as described below.

As indicated in block 710-5, the system determines by means of testing an execute mode switch indicator if the generated code is to be executed. This function enables the local and central caches to be populated or preloaded without having to execute the generated code. Later, when the application is started, it can access the contents of the central cache system 42-4 without the need to generate code for the preloaded statements.

With reference to FIG. 7b, when the execute mode indicator is turned off, indicating no execution is to take place (i.e., as determined by block 710-5), then the system moves down through the program sequence and exits via block 710-6.

When the execute mode switch indicator is set to "on", the system follows the "yes" path to block 710-7 of FIG. 7b wherein the statement is executed interpretively by the system calling RAM component of FIG. 3 which then calls the lower level access manager software to perform the actual database file access. The program then exits via block 710-6 and continues normal program execution at the point following that SQL statement.

Relative to block 710-4, when the system determines that code can be generated for that statement, it sequences to block 710-8. As indicated in block 710-8, the system generates the code for the SQL1 statement and stores it in local cache 24-2a. At this point, the system is operating as it did in the past. But, in contrast to the prior operation, the system continues its processing of the statement by searching central cache 24-4 for appropriately generated code for that statement. If the generated code is not there (i.e., process B or C assumed to be executing has not generated code for the statement during the time the system was sequencing to block 710-8), then the system makes a representative copy of the generated code and sends it over to central cache 24-4 as indicated in block 710-9.

The copy moved to the central cache system is termed to be a representative copy rather than an exact copy because some of the addresses and offsets must be converted before it could be deemed an exact copy. More specifically, the following items are converted: references to the "SEGID" of the code segment; references to other segments in the specific domain in which it will execute; references to other domains and references to offsets within the code segment.

After performing the copy functions of block 710-9, the system sequences to block 710-10. At this point, the generated code has been copied into the central cache 24-4. As indicated in FIG. 7b, the system performs a test of the "execute mode" switch which is the same as performed in block 5. But, in this case, the results of such test cause the system to sequence to a different point in the flow.

More specifically, when the execute mode switch indicator is not "on", then the system sequences to block 710-6 wherein it exits the flow and returns to program execution as previously described. At this point, the system has accomplished populating the local and central caches with generated code for that SQL1 statement.

When the execute mode switch indicator is "on" as determined in block 710-10, the system sequences to block 710-11 wherein the generated code associated with the statement is executed directly out of local cache 24-2a by the system. By contrast, central cache system does not execute the generated code right where it stored. That is, central cache system 24-4 serves more as a repository. The generated code is executed, again by calling the lower level access manager software to perform the actual database file access as indicated in block 710-11. As indicated in FIG. 7b, the system then sequences to block 710-6 where it exits in the manner described above.

With reference to block number 710-2 of FIG. 7b, if the system did not find the statement in local cache 24-2a, the system sequences from block 710-2 to block 710-3 wherein it tests for the presence of the SQL1 statement in central cache system 24-4. This is the case in which process A is just standing up and the central cache system 24-4 has been storing generated code for statements that were executed by processes B and C. In this case, when the system performs the test of block 710-3, the answer is yes causing the system to sequence to block 710-12. As indicated, the system then copies the generated code stored in central cache system 24-4 into local cache 24-2a. That is, the generated code is extracted out of central cache system 24-4, converted to executable form using the Localize Code routine, and moved into local cache 24-2a.

The operation of block 710-12 is performed as quickly as possible because central cache system 24-4 is capable of being shared among a number of processes and the time required for exclusive access must be minimized. Next, the system sequences to block 710-10 and then to block 710-11 after which it exits through block 710-6 as described above.

It will be noted that if the statement is in local cache 24-2a to begin with, then the system does not have to do perform any operations in central cache. The system just executes the generated code for the statement directly out of local cache 24-2a that is fastest mode of operation (just sequences through blocks 710-2, 710-10 and 710-11). Thus, in steady state, when the local cache 24-2a is large enough, the system can run the fastest.

It is seen from the above description that the execute mode switch indicator provides a way of populating both local and central caches. Prior to the existence of this indicator, the code had to be executed when it was stored in the cache. But if the purpose of the execution was solely to pre-populate the cache, the changes to the database that resulted from the execution of the code had to be undone. Alternatively, the statement could be written to modify a record in the database that would never be subsequently used. The addition of the execute mode switch allows the use of a simpler mechanism for avoiding this undesired execution while still populating the cache.

It should be noted that the execute mode switch indicator is used differently for local cache and for central cache. With just a local cache involved, the execute mode switch is turned off during the population of the local cache, but must be later turned on by that same process in order to utilize the preloaded cache. This is because the local cache is deleted when the process terminates. With the addition of the central cache, the executed mode switch can be turned off for a process (or set of processes) that exist for the explicit purpose of populating the central cache. Following the termination of these processes, subsequent processes (that have the execute mode switch set to "on" as is the default), can access the code that was previously loaded into the central cache. The use of the execute mode switch may involve more than turning it "off" at the start of an existing application, particularly in those applications in which the result of one SQL statement is used in subsequent SQL statements or in subsequent logic in the application. This is because when the execute mode switch is set to "off", the SQL statement cannot return data from the database nor result in modifications to the database.

Configuration Scenarios

It may be desirable to alter the sizes of the local and central caches through the use of configuration system and utility directive arguments, respectively. If a local cache is configured to be sufficiently large to hold all or a majority of the SQL statements to be executed by the process, then the central cache system can be then used primarily during the ramp-up process. Once the required SQL code is moved into the local cache of the processes, cache searches will result in local cache hits and the central cache system will not need to be accessed. Given enough main memory space to minimize paging of the local caches, this will result in maximum performance but will require the most memory resources. Thus, the administrator may alter certain configuration parameters by changing environmental variables as described in Appendix IV for use by those processes not already in execution.

As indicated above, it is also possible to logically change the size of a central cache by cache utility commands that invoke the SCUP component 304-7 of FIG. 4a. For example, the user could first issue a DELETE_CENTRAL_CACHE command and then issue a CREATE_CENTRAL_CACHE command as indicated by blocks 730 and 740 of FIG. 7a. This can be done while the application/process is running. The delete command would be used to delete the central cache associated with the process and the create cache command would be used to create a cache having the same name but with a larger size as required for better performance. During the period in which the central cache does not exist, the process will continue executing using only the local cache. Once the central cache is created with the name of the deleted central cache, then the process will execute using the newly created central cache.

Additionally, the present example presumed that there is a single central cache system configured which is being shared by processes A, B and C. It may be determined that a number of central caches are needed to optimize performance because of the characteristics of the system workload. The key in determining whether to use more than one central cache system is to identify processes that frequently execute the same SQL statements and then associate those processes with the same central cache. It may be that there are multiple applications with sets of processes that execute those different applications. For example, the system may be running a loan qualification application program that is separate from an ATM application. In this situation, it may be important to ensure that the SQL statements utilized by the loan application are not displacing the SQL statements utilized by the ATM application. Therefore, it is desirable to create a second central cache for handling the ATM application. Also, in the case of the ATM application, since there is a small limited number of SQL statements, a large central cache is not required and the local caches may be configured to hold all of the SQL statements for that application. By contrast, the loan application may use a large variety of unique SQL statements such that the local cache size would be selected to hold only a small subset of those statements while the central cache size would be selected to hold the local cache statements as well as the rest of the statements which are not accessed as often.

When more than one central cache is created, the user can specify which one is to be used by: (a) each Userid (i.e., all processes that execute under that Userid); or (b) a specific process. This capability enables the user to group the processes that include the same SQL statements and that will therefore realize the most improvement in performance by sharing access to the same central cache.

Figure 8A:
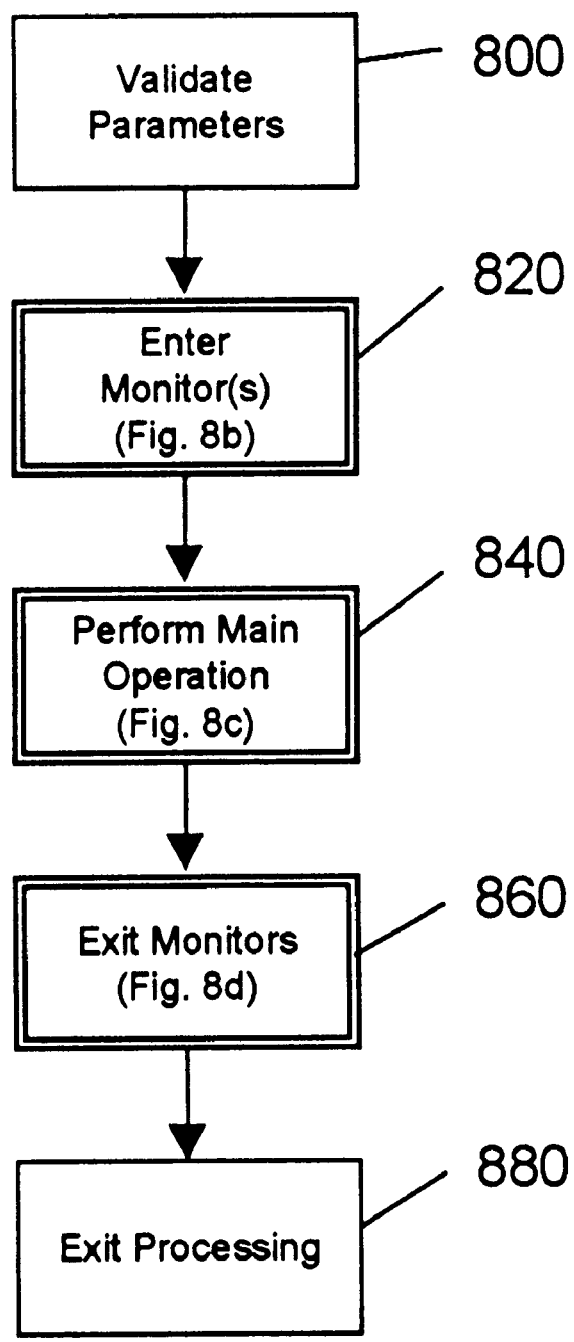
FIGS. 8a through 8d are flow charts illustrating in greater detail, the main operation of FIG. 7b in terms of processing commands/directives according to the present invention.

It is desirable to consider in greater detail, the main operations of the control mechanism 560 of the central cache system 304-5 of FIG. 4c. The main operations are depicted in FIG. 8a. This figure illustrates the operations performed by the control mechanism 560 in response to internal functions called during SQL statement processing, specific utility directives and user initiated commands described in Appendix III. The table below relates the central cache system functions (main operations depicted in FIG. 8a) to the different cache system components and the operations that utilize such functions. For example, SQL statement processing can result in SQL cache manager Interface 304-1 initiating the find_entry function.

| Central Cache System Function | "User" Component | Operation That Utilizes The Function |
| --- | --- | --- |
| Find_entry | SQL Cache Manager Interface (304-1) | SQL statement processing |
| Delete_entry | SQL Cache Manager Interface (304-1) | SQL statement processing |
| Insert_entry | SQL Cache Manager Interface (304-1) | SQL statement processing |
| Clear_cache | SQL Cache Utility Program (304-7) | CLEAR_CENTRAL_CACHE Directive |
| Delete_code | SQL Cache Manager Interface (304-1) | SQL statement processing |
|  | SQL Cache Utility Program (304-7) | DELETE_CODE_IN Directive |
| Reset_stats | SQL Cache Utility Program (304-7) | RESET_STATISTICS Directive |
|  | Application Interface | X_SQL_CACHE_RESET_CENTRAL_STAT |
| List_stats | SQL Cache Utility Program (304-7) | LIST_STATISTICS Directive |
|  | Application Interface | X_SQL_CACHE_GEN_CENTRAL_REPORT |
| List_models | SQL Cache Utility Program (304-7) | LIST_MODELS_IN Directive |
| List_tables | SQL Cache Utility Program (304-7) | LIST_TABLES_IN Directive |
| Get_cnodes | SQL Cache Utility Program (304-7) | DISPLAY_CODE_INFO_IN Directive |
| Get_code | SQL Cache Utility Program (304-7) | DISPLAY_CODE_INFO_IN Directive |
| Report_code | SQL Cache Utility Program (304-7) | (for debug and analysis) |

-continued

| Central Cache System Function | "User" Component | Operation That Utilizes The Function |
|---|---|---|
| Create_cache | SQL Cache Utility Program (304-7) | CREATE_CENTRAL_CACHE Directive |
| Delete_cache | SQL Cache Utility Program (304-7) | DELETE_CENTRAL_CACHE Directive |
| List_caches | SQL Cache Utihty Program (304-7) | LIST_CACHES Directive |
| Delete_obsolete_entries | Common (302-6), ODI (302-12) | DDL occurrence |

FIG. 8a

Referring to FIG. 8a, it is seen from block 800 that control mechanism 560 begins operations by first validating parameters of the call made to the central cache system 304-5 via interface 304-1. Parameters are passed that describe the code, when searching the Central Cache system for appropriate generated code. The parameters contain description information such as the normalized text of the SQL statement, attributes of the host variables, if any, cursor name, the owner and model names, etc. This information is passed in structures that are referenced by the descriptors that are passed as some of the actual parameters. If the caller of the Central Cache system does not pass a suitable descriptor that is supposed to reference the SQL statement description information, attempts to reference the information may result in a hardware fault. Another parameter that is passed is a descriptor to the area of memory of the caller that is to hold the generated code copied from the Central Cache system if it is found in the cache. If the descriptor does not reference sufficient memory and an attempt is made to copy the found code into this area, a hardware fault may occur. When references such as these result :n faults while the software is in a period of exclusive access to central cache structures, service may be denied to subsequent Central Cache system callers. For this reason, validation of parameters is performed prior to entry to any of the monitors described herein.

Following the validation operation, control mechanism 560 performs the main operations of the Central Cache System 304-5 as indicated in block 840. These operations require exclusive access to the various data structures illustrated in FIG. 5. Therefore, before the control mechanism 560 passes control to functions of block 840, it performs the "registration of exclusive access". As indicated above, in the preferred embodiment, exclusive access to shared cache resources (i.e., shared structures) is controlled through the use of a queue monitor mechanism. It will be appreciated that a central cache system may be implemented using other types of exclusive access mechanisms.

As indicated in block 820, the one or more monitors is entered prior to the execution of the main function requested by the user of the cache system, and following such execution, the monitor(s) are exited can otherwise terminated as indicated in block 860. Finally, the system sequences to block 880 where exit processing is performed prior to returning to the caller (i.e., requesting process).

Figure 8B:
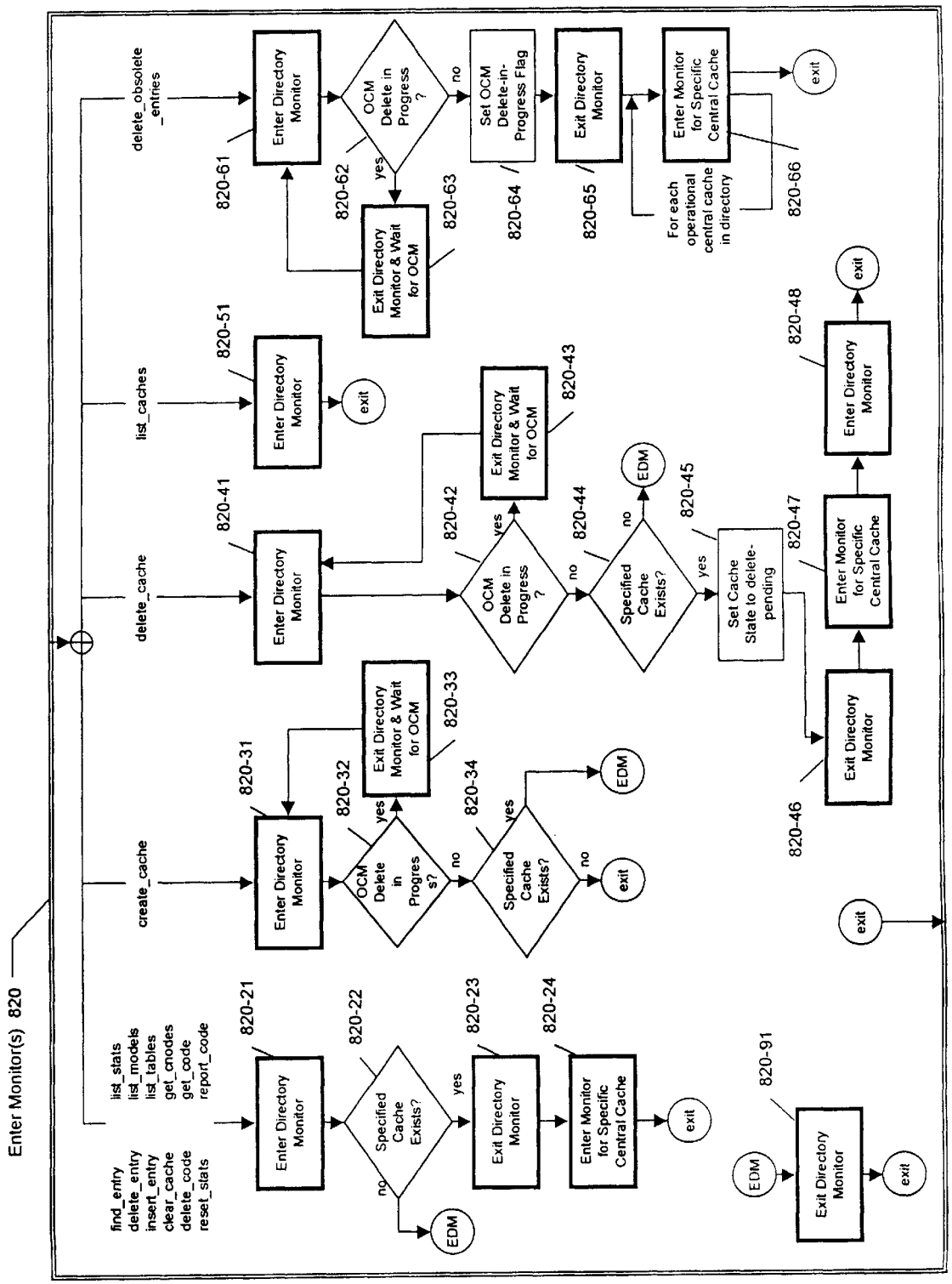
Figure 8C:
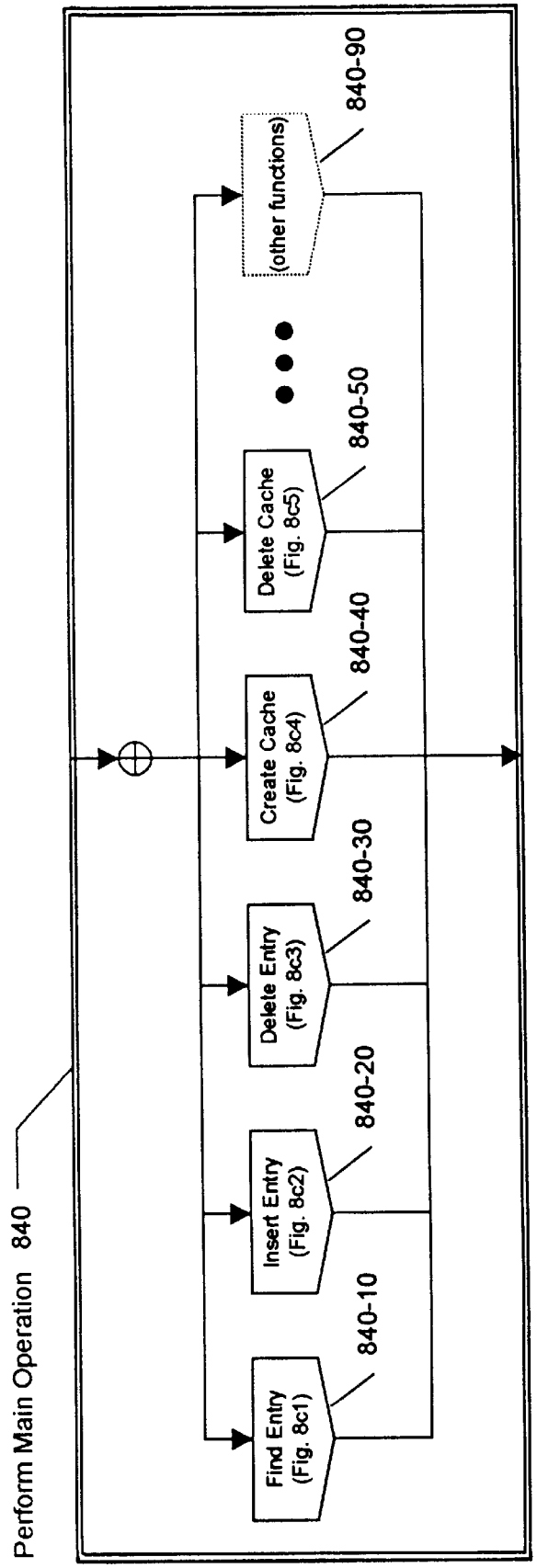
Figure 8D:
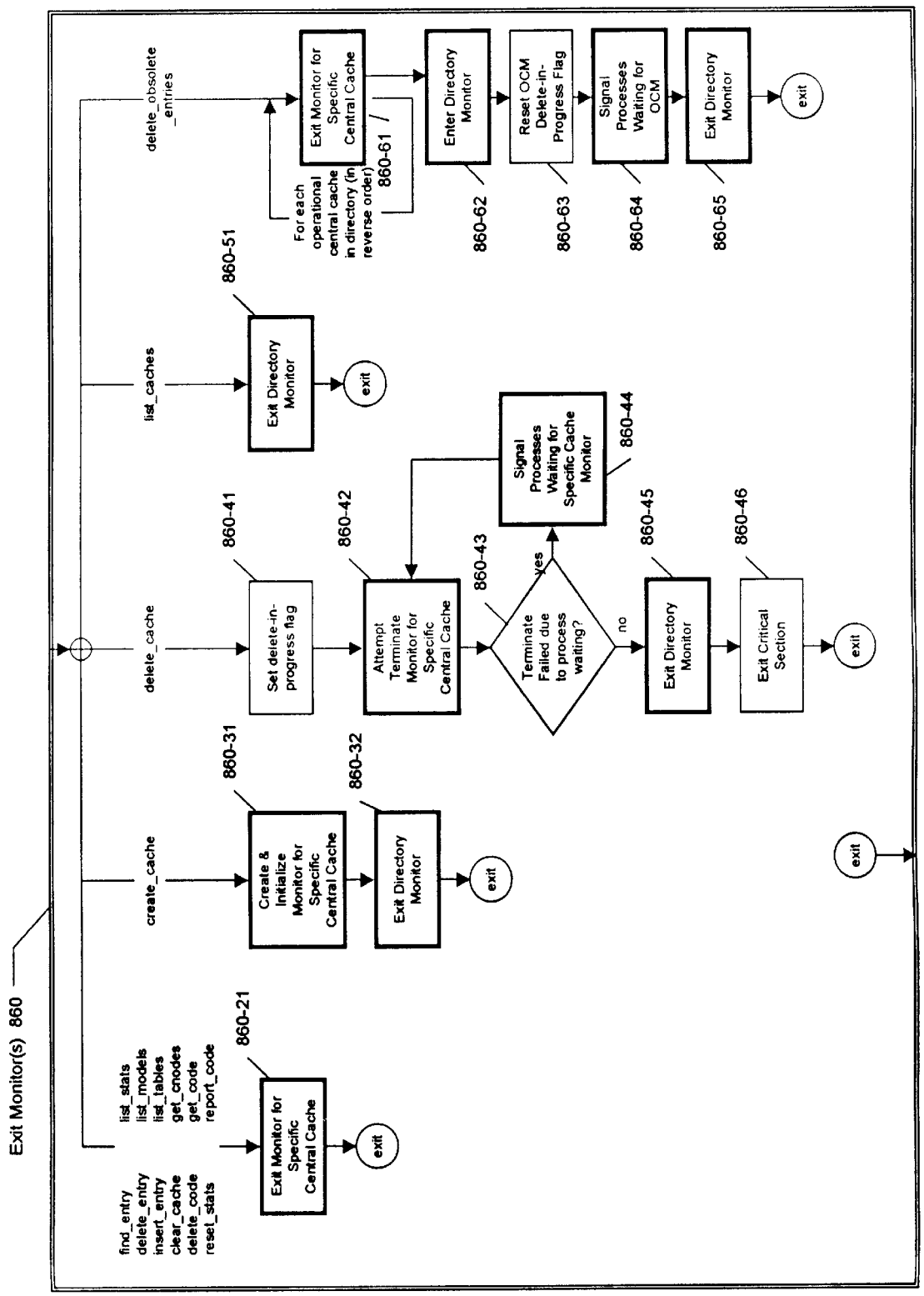

FIGS. 8b through 8d illustrate in greater detail of the operations performed by control mechanism 560 in executing the control flow illustrated in blocks 820, 840, and 860.

FIG. 8b

FIG. 8b illustrates the processing performed by control mechanisms 560 involved in entering the monitors that enforce the exclusive access to the structures of the Central Cache System illustrated in FIG. 5. FIG. 8d illustrates the processing performed by control mechanism 560 involved in exiting the monitors that enforce the exclusive access to the structures of FIG. 5. These figures indicate by the listings of functions (i.e., functions find_entry through delete_obsolete_entries) that the processing which occurs depends on the particular function of the Central Cache System being requested.

As discussed above, in the preferred embodiment, different monitors are used to protect the global shared control structures of the Central Cache System 304-5 and the structures 510 for each cache. One monitor referred to in FIGS. 8b and 8d as the Directory Monitor is used to protect access to the Cache Directory 500. As indicated, a monitor protects the structures for each specific central cache. Thus, there is one such monitor for each central cache that exists.

FIG. 8b shows that for most functions performed by the control mechanism 560 of the Central Cache system 304-5 proceed in the following manner. First, the Directory Monitor is entered as indicated in block 820-21. Next, the control mechanism 560 searches Cache Directory 500 for an entry representing the requested central cache as indicated in block 820-22. If an entry for the requested central cache cannot be found, then the requested central cache is deemed to not exist and the control mechanism 560 sequences to block 820-91 where the Directory Monitor is exited. If the requested central cache exists, that is, an entry for the cache is found in the Cache Directory 500, the control mechanism 560 exits the Directory Monitor as indicated in block 820-23, and the monitor associated with the requested central cache is entered as indicated in block 820-24. The control mechanism 560 then exits as indicated in block 820 of FIG. 8a and the control mechanism 560 sequences to the Perform Main Operation block 840.

For the Create Cache function, control mechanism 560 begins by entering the Directory monitor as indicated in block 820-31 of FIG. 8b. Next, control mechanism 560 makes a check to determine if there is a OCM delete operation in progress as indicated in block 820-32. As discussed above, the Obsolete Code Manager, OCM 304-10 is a component of the preferred embodiment used to remove generated code from the central cache system when it no longer applies to the current state of the relational tables, or permissions thereof It will be appreciated that the OCM component 304-10 is not a required component of a central cache system.

If control mechanism 560 determines that there is an OCM delete operation in progress as indicated block 820-32, the Directory Monitor is exited and control mechanism 560 waits until that operation is completed as indicated in block 820-33. Once that occurs, the control mechanism 560 resumes operation by entering the Directory Monitor as indicated in block 820-31. If there is no OCM delete in progress as indicated in block 820-30, then control mechanism 560 checks to see if the specified central cache exists as indicated in block 820-34. If it already exists, another cache with the same name cannot be created so control mechanism 560 exits the directory monitor as indicated in block 820-91. If the specified cache does not yet exist, the control mechanism 560 can exit to block 820 of FIG. 8a so that the main function, namely the Create Cache, can be executed or processed.

For the Delete Cache function, control mechanism 560 begins by entering the monitors (i.e., Directory Monitor) as indicated in block 820-41. As with the Create Cache function, if an OCM delete function is in progress 820-42, the control mechanism 560 exits the Directory Monitor and the cache system control mechanism 560 waits until that function is completed as indicated in block 820-43. Then the control mechanism 560 resumes control by re-entering the Directory Monitor 820-41. If there is no OCM delete function in progress 820-42, control mechanism 560 checks to see if the specified cache exists 820-44. If the named cache does not exist there is nothing to delete, so the control mechanism exits the Directory Monitor as indicated in block 820-91. If the specified cache exists 820-44, the control mechanism 560 sets the cache state in the Directory to delete-pending as indicated in block 820-45 and then exits the Directory Monitor as indicated in block 820-46. The control mechanism 560 then enters the monitor associated with the named cache as indicated in block 820-47 and reenters the Directory Monitor as indicated in block 820-48. The control mechanism 560 exits its flow to block 820 of FIG. 8*a*, ready to perform the main operation portion of Delete Cache function.

As indicated in FIG. 8*b*, for the List Caches function, the control mechanism 560 enters the Directory Monitor as indicated in block 820-51 and exits control from outer block 820. For the Delete Obsolete Entries function, associated with the Obsolete Code Manager, OCM, control mechanism 560 begins by entering the Directory Monitor as indicated in block 820-61. If an OCM delete is in progress in block 820-62, the control mechanism exits the Directory Monitor and the cache system waits until OCM delete is complete as indicated in block 820-62. If an OCM delete function is not in progress 820-62, control mechanism proceeds by setting an OCM Delete in Progress flag as indicated in block 820-64, and then exits the Directory Monitor as indicated in block 820-65. Then, for each operational central cache listed in the Cache Directory 500, the control mechanism 560 enters the monitor associated with that cache as indicated in block 820-66. The control mechanism 560 then exits from the outer block 820, ready to perform the main operation portion of the Delete Obsolete Entries function FIG. 8*d*

FIG. 8*d* illustrates in greater detail, the operations of block 860 of FIG. 8*a* which is reached following the execution of the main operation requested functions of block 840. These operations are required to exit, or otherwise wrap-up the monitors left in the entered state from performing the operations of FIG. 8*b*. As in FIG. 8*b*, the flow executed by control mechanism 560 depends on the particular cache function requested. For most of the functions, as indicated in block 861-21, all that is required is to have the control mechanism 560 exit the monitor for the specific central cache that was accessed by the function. Once this occurs, control mechanism 560 exits control from outer block 860.

For the Create Cache function, control mechanism 560 begins by creating and initializing the monitor for the central cache that is being created as indicated in block 860-31. The control mechanism 560 then exits the Directory Monitor as indicated in block 860-32 and then exits the outer block 860. For the Delete Cache function, control mechanism 560 begins by setting a delete-in-progress flag as indicated in block 860-41. Then control mechanism 560 attempts to terminate the monitor associated with the specific central cache. It will be noted that in the preferred embodiment, monitors utilize limited resources, so when a particular monitor is no longer required, such resources are returned to the operating system by terminating the monitor.

If there is a process waiting to enter the monitor, the termination request will fail. If the monitor termination fails due to this condition in block 860-42, control mechanism 560 sends a Signal event to the waiting processes as indicated in block 860-44 and then makes another attempt to terminate the monitor 860-42. Control mechanism 560 continues this operation until there are no more processes waiting to enter the monitor causing the check of block 860-43 to take the "no" path. The control mechanism 560 then exits the Directory Monitor as indicated in block 860-45. Since the monitor is contained within a critical section, which was entered when the terminated monitor was entered, the critical section must be explicitly exited. Therefore, control mechanism 560 exits the critical section as indicated in 860-46, and then exits the outer block 860.

For the List Caches function, control mechanism 560 only needs to exit the Directory Monitor as indicated in block 860-51. For the Delete Obsolete Entries function, associated with the Obsolete Code Manager, OCM, control mechanism 560 begins with block 860-61. For each operational central cache listed in the Cache Directory 500, the control mechanism 560 exits the associated monitor. The monitors are exited in reverse order from the order in which they were entered in block 820-66 in FIG. 8*b*. Control mechanism 560 resumes operation with block 860-62 by entering the Directory Monitor. The control mechanism 560 resets the OCM delete-in-progress flag as indicated in block 860-63, and signals any processes waiting for OCM delete to complete as indicated in block 860-64. The control mechanism exits the Directory Monitor as indicated in 860-65 and then exits the outer block 860.

FIG. 8*c*

FIG. 8*c* illustrates in greater detail, the operations of block 840 corresponding to the main operation of the cache function requested. As indicated, control mechanism 560 sequences to a different place/operation based on the cache function being requested. The main functions of the Central Cache System 304-5 include the Find Entry function of block 840-10, the Insert Entry function of block 840-20, the Delete Entry function of block 840-30, the Create Cache function of block 840-40, and the Delete Cache function of 840-50). These functions are shown in greater detail in FIGS. 8*c*1 through 8*c*5.

FIGS. 8*c*1 through 8*c*3

The Find Entry function of FIG. 8*c*1 begins with control mechanism 560 performing a search of the cache as indicated in block 840-110. This search operation is illustrated in greater detail in FIG. 4*b*. If there is a cache "hit", that is, the desired entry in the cache is found in the central cache 840-120, control mechanism 560 sequences to block 840-130 wherein the code associated with the found entry is copied by control mechanism 560 to the location specified by the caller (i.e., the SQL Cache Manager Interface Component 304-1). The control mechanism 560 relinks the Cnode representing the found cache entry at the head of the most-recently-used (MRU) list as indicated in block 840-140. In this case, the control mechanism function will return with a "cache hit" status. If the cache search results in a cache "miss", that is, the desired entry is not found in the central cache as indicated in block 840-120, the control mechanism function will return a "cache miss" status.

The control mechanism 560 begins Insert Entry function processing of FIG. 8*c*2 with a search of the cache as indicated in block 840-210. This search is illustrated in greater detail in FIG. 4*b*. If there is a cache "hit" 840-220, this means that the entry has already been placed in the central cache. Normally this will not be the case since an Insert Entry function usually follows a Find Entry function that has resulted in a "miss". However, when there are multiple processes accessing the central cache, the particular entry may have been inserted between the time of the Find Entry that resulted in a "miss" and the time of the current Insert Entry function. The search indicated in block 840-210 is used to make sure that duplicate entries are not put into the cache. Therefore, if control mechanism 560 detects a "hit" in block 840-220, most of the processing of the Insert Entry function may be skipped and control mechanism 560 returns to exit block 840. If the cache search does not result in a "hit", control mechanism 560 takes the "no" path of block 840-220.

Control mechanism 560 performs a calculation to see if the memory required by the current entries in the cache plus the code for the entry being inserted exceeds the configured maximum as indicated in block 840-230. If so, the control mechanism 560 deletes the excess code as indicated in block 840-240. This operation consists of deleting one or more entries starting from the end of the MRU list until the memory required for the code in the cache including the code being inserted is less than or equal to the configured maximum. If the memory required for the current entries in the cache plus that required for the entry being inserted is less than or equal to the configured maximum as indicated in block 840-230 "no" path, or the excess code has been deleted as indicated in block 840-240, control mechanism 560 resumes or sequences to block 840-250 in which it performs the operation of inserting the Cnode representing the new entry. This operation involves linking the Cnode into the appropriate bucket and placing the Cnode at the head of the MRU list. Then control mechanism 560 creates a code segment 540 to hold the generated code being inserted into the cache 840-260. The code is copied into the created segment 840-270. The code is then linked into the OCM structures 840-280 and control returns to exit block 840.

The control mechanism 560 begins Delete Entry function of FIG. 8c3 with a search of the cache as indicated in block 840-310. This search is shown in greater detail in FIG. 4b. If the search does not result in a cache "hit", that is, it results in a cache "miss", the entry does not currently exist in the cache and control mechanism 560 returns to exit block 860. If the search results in a cache "hit" as indicated in block 840-320, control mechanism 560 continues the deletion of the entry by unlinking the code from the OCM structures as indicated in block 840-330, deleting the code segment as indicated in block 840-340, and the freeing the Cnode as indicated in block 840-350. Freeing a Cnode involves removing the it from the bucket list in which it existed, moving the Cnode to the end of the MRU list, and marking the node as "available". Moving the node to the end of the MRU list makes it available for reuse ahead of any active Cnodes.

FIGS. 8c4 and 8c5

FIGS. 8c4 and 8c5 show in greater detail, the Central Cache System functions Create Cache and Delete Cache. The control mechanism 560 begins the Create Cache function of FIG. 8c4 by searching for an available slot in Directory Table 500 as indicated in block 840-410. If an available slot is not found 840-420, the control mechanism function returns an error condition to the caller when the Central Cache System control mechanism software is exited. If an available slot is found in the Directory Table, the control mechanism 560 makes an entry into the Directory Table 500 and enters information related to the cache, such as the cache name, the date, and the time into this entry as indicated in block 840-430. The control mechanism 560 then creates the segments required for the cache as indicated in block 840-440. These segments include the Bucket segment 510b, the Cnode segment 510c, the Code Descriptor segment 510d and the obsolete code manager segments 510e, consisting of the TMO Bucket segment and the TMO Entry segment. The control mechanism 560 allocates a rotation set from the linkage segment 520. This set consists of the descriptors that specify the cache data segment to be used for the cache 510a, as well as the condition id slot to be used by the monitor for the central cache. The control mechanism 560 stores data describing the characteristics of the cache being created in the cache data segment as indicated in block 840-460, and initializes the Cnode structures as indicated in block 840-470. This initialization includes initialization of the bucket structures and the linking of all the nodes into the MRU list. Then, the control mechanism 560 initializes the OCM structures as indicated in block 840-480, and sets the cache state in the Cache Directory 500 to "operational". The control mechanism 560 returns to exit block 840.

Control mechanism 560 begins the Delete Cache function of FIG. 8c5 with block 840-510, wherein the code segments associated with each entry in the cache are deleted. Then, as indicated in block 840-520, control mechanism 560 resets the data-segment-in-use flag in the Cache Data segment 510a. The segments associated with this cache are deleted as indicated in block 840-530. These segments include the Bucket segment 510b, the Cnode segment 510c, the Code Descriptor segment 510d and the obsolete code manager segments 510e, consisting of the TMO Bucket segment and the TMO Entry segment. Finally, as indicted in block 840-540, control mechanism 560 deletes the entry for this cache from the Cache Directory 500. The control mechanism 560 returns to exit block 840.

From the above, it is seen how the multicache organization of the present invention can be configured as a function of the type of applications being run by the system and the level of performance desired based on available memory resources. While many of the same mechanisms may be used by both local and central cache systems, the dynamic creation of persistent central cache structures provides a level of performance which is substantially greater than that previously provided by the prior art local cache systems.

While the present invention was described relative to processing SQL statements, it will be obvious to those skilled in the art that the multicache organization of the present invention may be used in conjunction with other languages, code, etc.

APPENDICES

I. Glossary
II. Description of Code Generation Support Routines
III. Description of Cache Utility Interface Commands
IV. Description of Configuration Interface Commands
V. Description of Application Visible Interface Commands
VI. Control Structures Used by Multicache System Appendix Glossary .MODEL. file-A file used by RDBMS to contain the definition of a host-relational model. Each model created by a CREATE MODEL statement has a .MODEL. file.

access method The way in which the RDBMS accesses relational data, using hash, indexed, or scan access.

access patterns-The pattern formed by queries that access relational tables: which rows are accessed, with what frequency, using which access methods. Knowledge of actual or expected access patterns is essential in performance tuning relational tables and the SQL statements that access the tables.

access plan-The RDBMS Optimizer's plan for executing an SQL statement, including the type of access to each table, order of access, whether any sorts or joins are performed, and related information.

administrator-An individual who carries out tasks such as creating databases and/or monitoring the use and performance of those databases.

application-A program or set oi programs that performs a specific task, such as entering orders and updating inventory records.

application programmer (application developer)-An individual who participates in the design, implementation, and/or testing of applications, including end-user facilities.

attribute-A descriptive characteristic of an entity, such as name, order number, item quantity, and so on. A characteristic such as UNIQUE or NOT NULL that can be applied to a column or other entity.

BatchSQL A mode of operation in which SQL statements and ISQL commands are processed in batch mode instead of interactively.

browsing-Accessing the result of a retrieval that returns multiple rows, possibly by skipping through the data to read only selected rows, and possibly moving both forward and backward through the rows.

bucket (hash)-The increment of storage used to contain data rows in a hash table. A hash bucket is equivalent to a control interval (CI).

bucket (node) the bucket id to which this entry belongs.

Buffer Manager-The software that manages buffer pools.

buffer pool-Main memory that is reserved for the buffering requirements of one or more tablespaces, tables, or indexes.

CALC access-One of the methods of accessing relational tables or DM-IV databases that are accessible from the RDBMS. A synonym tor hash access in the case of host-relational tables.

Cartesian product-The result of processing an SQL statement that references multiple tables but has no WHERE clause. Every row of each table is concatenated with every row of every other table. This operation can use excessive resources.

Central SQL Cache-Configured memory space in which code segments generated by the RDBMS are stored for reuse if the same SQL statement is executed again by any process that has been associated with this same Central SQL Cache. The use of one of more Central SQL Caches is optional and under Administrator control.

CHARACTER data type-An RDBMS data type defined as fixed-length character.

code generation-The RDBMS process that generates executable code for a specific SQL statement instead of executing that statement interpretively.

code segment-The code generated by the RDBMS for a specific SQL statement. Each code segment is stored in the Cache for reuse if the same SQL statement is executed again by the same process in the case of Process-Local SQL Cache, or by another process in the case of Central Cache.

code_token (node) An item that uniquely refers to a segment of generated code.

column-The vertical component of a table. A column contains information about one of the attributes of an entity. The relational equivalent of a field.

concurrency control-The management of file accesses by processes operating concurrently, with the goal of ensuring that no process interferes with any other process and that the integrity of the data accessed in common is maintained.

concurrency level-The number of processes i hat concurrently access the same data.

concurrent access-Two or more processes accessing the same data table or partition at the same time.

Control Interval (CI)-The physical space increment used to store data in RDBMS files, processed as a unit. Synonymous with page. In a hash table, a CI is called a hash bucket.

correlated subquery-A subquery that is executed repeatedly, once for each row of the table identified in the outer-level query, in order to evaluate the condition expression.

count (bucket header) The number of nodes in the bucket list.

cross-product-A synonym for Cartesian product.

current structure A structure used for storing information relating to the current cache request which describes the statement and associated attributes for which a match is being searched in the cache system.

cursor-A mechanism designed to allow multi-row results returned by RDBMS to be processed a row at a time in COBOL or Virtual C programs.

cursor_name.leng (current) The length, in characters, of the cursor name.

cursor_name.text (current) A pointer to the text of the cursor name.

data type-A definition of how the data in a column is stored and managed. Commonly used data types include CHARACTER, NUMERIC, and FLOAT.

database-A collection of data that has meaning to an organization or to an individual and that is managed as a unit.

Database Management System (DBMS)-A set of software that controls the creation, organization, and modification of one or more databases, and provides access to the stored data.

Data Definition Language (DDL)-Statements used to define the entities, attributes, and relationships that make up a database. DDL statements in RDBMS include CREATE MODEL, CREATE TABLE, CREATE INDEX, and others.

data independence-A property of an application that allows it to operate unchanged when the definition of the database is changed. Complete data independence is impossible to obtain, but good programming practices can be used to achieve a reasonable degree of data independence.

Data Manipulation Language (DML)-Statements used to access data and potentially to change data content. DML statements in RDBMS include SELECT and UPDATE.

DATE data type-A special-purpose RDBMS data type used to store a four-byte date that can be used in comparisons or computations. The date is formatted in packed decimal in the row in storage, and expanded when read into application memory.

DECIMAL data type-An RDBMS data type defined as fixed-length with decimal content.

decision support-A mode of access to cata designed to support users' need for data on which to base business or organizational decisions. Interactive, usually read-only, and usually with less stringent response requirements than production transaction processing.

default-The value used or the action taken if no other value or action is specified explicitly.

denormalization-A process in which data redundancy eliminated during normalization is selectively reintroduced to improve performance. Denormalization introduces the risk that data anomalies will occur.

dependent column-A technique in denormalization in which one column defines the meaning of the content of another column. Using a dependent column introduces the risk that data anomalies will occur.

derivable column-A technique in denormalization in which a column contains the results of calculations carried out using the content of one or more other columns, usually from at least one other table. Using a derivable column introduces the risk that data anomalies will occur.

descriptor A hardware-related data item that defines a segment (segment descriptor) or a domain entry (entry descriptor).

Distributed Data Access (DDA)-Software hat allows access to multiple, potentially distributed, databases as if they made up a single logical database.

domain A set of segments that can be referenced by a process and the access that process is permitted. A domain includes the segments permanently linked thereto and the segments which are passed to the program by other programs and entry points into other domains for calls and returns.

dynamic SQL-SQL that is not hard-coded into an application program, but instead is defined dynamically using any of several possible methods: e.g., keyed in by a user, read in from a file, etc.

entity-A fundamental part of an enterprise, such as a person, an order, an item, and so on. Entities are often fundamental elements in a database.

extent-A unit of allocation of mass storage space, used by the File Management Supervisor (FMS).

expression-An operand or a collection of operators and operands that yields a single value extract-A relational table that contains data selected from I-D-S/II, conventional, and/or relational models. An extract is created using the RDBMS Extract Facility (utility program).

file protection attributes-Attributes that define the data integrity protection to be applied to the associated file. Host-based relational files are created automatically with the file protection attributes ACCESS/MONITOR/ and ABORT/ROLLBACK/.

file set-A group of files that can use the same set of buffers in a buffer pool.

fragmented-The term used in relational technology to indicate that a table has been partitioned intentionally, forming multiple parts, to improve performance. A table can be fragmented horizontally or vertically.

FROM clause-The part of an SQL statement that specifies the table(s) from which data is to be accessed.

generated code-A reusable set of machine instructions that are produced to execute a particular SQL statement.

gen_time (node) The approximate time that was required to generate the associated segment of code.

GROUP BY clause-The part of an SQL statement that specifies how to organize retrieved data into groups of related rows, then include only one row per group in the result.

hash access-One of the methods of accessing relational tables. Hash access operates on a hash key value, using a hash function, to generate a bucket number in which the associated data row is stored. The same hash function is used to retrieve the data row. Potentially the fastest method of access to relational data when the exact value of the hash key is known. Sometimes called CALC access.

hash bucket-The increment of storage used to contain data rows in a hash table. A hash bucket is equivalent to a control interval (CI).

hash function-The formula used to generate a hash bucket number from a hash key value in order to decide where to store a data row, and later how to retrieve the row.

hash key-The column(s) whose values are used as input to the hash function to determine where to store the associated data row, and later how to retrieve the row.

hash table-A relational table organized in terms of hash buckets. Data rows are stored in the hash buckets using the hash function.

HAVING clause-The part of an SQL statement that specifies selection criteria (defined as search conditions) to be applied to results that have been grouped using the GROUP BY clause. Only the rows that match the HAVING criteria are included in the final result.

head (bucket header) The node id of the first node (not necessarily relative to time) in the bucket list.

host variable-Storage allocated by a language processor such as COBOL-85 for use in passing variable information to or from an SQL statement.

host-relational files-Files managed by RAM/RFM and maintained on mass-storage devices attached to a system. The term is used to distinguish these files from relational files maintained by a Relational Data Base Computer linked to a system.

index-A set of pointers to data in relational tables, used to improve the speed of access to the data. The index is maintained in the form of a balanced B-tree structure.

index key-The column(s) whose values are included in the index for the table.

indexed access-The access mode in which RDBMS uses one or more indexes to retrieve the requested information. In some cases, RDBMS can retrieve the requested information directly from the index, without accessing the data table.

indicator variable-An indicator used to notify the application that an exception condition, such as an overflow or truncation error, occurred. When used to indicate the presence of the null value, the indicator is referred to as a null indicator variable.

indicator column-A technique in denormalization in which an indicator column in one table indicates whether an access to a second table is required. Using an indicator column introduces the risk that data anomalies will occur.

INTEGER data type-An RDBMS data type used to store binary values.

integrity-The property of being logically correct and consistent. In some cases, this term also implies denying access to unauthorized users and processes.

INTER-An SQL operator that combines the results of two SELECT clauses and identifies the intersection of those results; that is, the rows that appear in both sets of results. INTER is a set operator; other set operators are MINUS and UNION.

inventory control page-A record of how much space is available in pages (control intervals), kept separately from the pages that contain data.

join-An operation that combines two or more tables based on some common attribute value(s) that the tables share. There is no specific JOIN statement or operator visible to an application developer or user. Any SELECT statement that references multiple tables implies that a join is required.

key head column-The first column of a multi-column index key.

linkage segment A segment containing descriptors which have been created by a linker prior to execution or by the operating system during execution.

literal-A constant value that cm be included in an SQL statement and used to compare against values that exist in the table to be accessed.

loading-The process of entering data into relational tables after the tables have been first defined or have been redefined after restructuring. Properly called populating.

locking-An Integrity Control technique in which access is prohibited to some set of data while access for modification is in process. While access is prohibited the data is said to be locked. Locking prevents other processes from accessing data that may be changing, and from modifying data being modified by the locking process.

maintenance-In this context, the actions required when an index or table becomes physically disorganized so that index information or table data may be stored in multiple locations, with a negative impact on performance. Maintenance typically involves dropping and re-creating indexes and dumping and repopulating tables.

MINUS-An SQL operator that identifies the difference between the results of two SELECT clauses, and retains only those that are different. MINUS is a set operator; other set operators are INTER and UNION.

model-An RDBMS (relational) term that is equivalent to database. A model can include one or more tables.

model_token (node) A numerical identifier used by the Director component to identify a model that is currently in use.

model_token (current) An index into a table used by the Director component to uniquely identify a model.

mru_next (node) The node id of the next node in the mru list; has value of NULL_NODE if this is the least recently used node.

mru_rev (node) The node id of the previous node in the MRU list; has value of NULL_NODE if this is the most recently used node.

multi-column hash key-A hash key made up of more than one column.

multi-column index (key)-An index whose key is made up of more than one column.

multi-index access-The situation in which RDBMS uses more than one index to satisfy a retrieval request.

multi-table tablespace An unpartitioned tablespace that contains multiple tables. The tablespace is a single physical file. Contrast this with a partitioned tablespace.

next (node) The node id of the next node in the bucket list; has value of NULL_NODE if this is the last node in the list (i.e., no next).

non-bash table-An RDBMS relational table that is not organized in terms of hash buckets. The data can be retrieved using indexed access or scan access, not hash access.

normalization-A process in which data redundancy is eliminated from the design of data tables. There are various forms of normalization, ranging from first normal form to fifth normal form. Normalization minimizes the risk that data anomalies will occur.

null value-A value designed to be used when the actual value is unknown or inappropriate. For example, using the null value for a price that has not yet been defined avoids the ambiguity of using a zero value in this case.

null indicator variable-An indicator used to notify the application that a column contains the null value.

NUMERIC data type-An RDBMS data type defined as fixed-length and limited to the numerals 0–9.

num_host_var (current) The total (input and output) of host variables for the statement.

num_wds_(node) The size of the generated code in words.

Operational Directory Interface (ODI)-A data definition directory used by RDBMS.

Optimizer-The software component of RDBMS that analyzes each SQL statement and defines the access plan that will produce the optimum performance for the execution of that statement.

ORDER BY clause-The part of an SQL statement that specifies how to order (sort) the final result after all other clauses of the statement have been processed.

page-The physical space increment used to store data in RDBMS files, processed as a unit. Synonymous with control interval (CI).

parallel batch execution-A technique in which one large batch program is partitioned into multiple programs that can run in parallel to shorten the elapsed time required for execution.

partitioned tablespace-A tablespace that contains a single table that is too large to process efficiently as one entity. The tablespace and the table are separated into partitions that can be placed on different mass storage devices. Each partition can be processed independently.

performance-The ability of applications and interactive facilities to meet users' requirements for speed of response in interactive applications or speed of throughput in production batch an(i/or transaction processing applications.

populating-The process of entering data into relational tables after the tables have been first defined or have been redefined after restructuring. Sometimes called loading.

pre-joining-A technique in denormalization, in which columns from one table are copied into another table to avoid a join when information from both tables is required. Pre-joining tables introduces the risk that data anomalies will occur.

prev (node) The node id of the previous node in the bucket list; has value of NULL_NODE if this is the first node in the list (i.e., no previous).

primary index (key)-In some implementations, but not in RDBMS, an index (and associated key) that uniquely identifies each row of a table.

process-An execution unit, which may or may not be identical to an application program. (An application program may involve multiple processes.)

Process-Local SQL Cache-The configured memory space in which code segments generated by ILBMS are stored for reuse if the same SQL statement is executed again by the same process.

query-Used to refer to any SQL statement that causes an access to relational tables, regardless of whether the access is followed by a modification.

read-ahead feature-The Buffer Manager's operational mode in which up to 16 pages are read into the buffer pool at one time, so that the data will be available when needed. The read-ahead feature is used in scan access mode.

recovery-The process of restoring database(s) and/or application(s) to a known state after an exception condition or a process or system failure.

Relational Access Manager (RAM)-The part of the RDBMS software that manages relational tables.

Relational database-A database that is defined in terms of entities, attributes, and relationships, and that observes the concepts defined originally by E. F. Codd.

Relational Database Management System (RDBMS)-The INTEREL Software that manages relational databases.

Relational File Manager (RFM)-The part of the RDBMS software that accesses data from relational files, as directed by the Relational Access Manager (RAM).

relationship-An association of one or more entity types with one or more other entity types.

reorganization-A synonym for maintenance and/or restructuring.

repair-The process of correcting an index that was damaged during processing because of a software or hardware problem or failure.

repeating columns-A technique in denormalization in which a repeating group (OCCURS clause) is implemented as a series of columns in a single table. Repeating columns introduce the risk that data anomalies can occur.

response-The speed with which the system replies to a request during interactive processing.

restructuring-Changing the definitions of tables and/or indexes when the logical design of the database changes or the patterns of access to the data change. Restructuring typically follows the same procedure required during the initial design, definition, and population of a database. Restructuring is one form of maintenance.

result-The data obtained by executing a query. Results can be displayed on the user's screen or printed on a hardcopy device such as the system printer.

rollback-The process of returning a table to its state before the function that is rolled back was begun, or to the state at which a checkpoint was taken.

row-The horizontal component of a table. A row consists of a sequence of values, one for each column of the table.

scan access-The access mode in which RDBMS scans a table sequentially, row-by-row, to retrieve the requested information.

search condition-The specification of how to identify the desired data in the rows and columns retrieved when processing an SQL statement.

secondary index-In some RDMBS implementations, any index that is not a primary index. In RDBMS, most indexes are treated as secondary indexes; cluster indexes and system-generated indexes created because a column is defined with the UNIQUE attribute are the exceptions to this rule. RDBMS enforces the uniqueness of the columns included in these indexes.

segid A 12-bit data item that defines a segment or entry indirectly by specifying the location of the segment or entry descriptor.

SELECT-An SQL statement that defines the information to be selected from one or more tables. Also a clause that includes the SELECT verb in an SQL statement.

selectivity-A characteristic of a data column or columns in which few rows have the same values. An index key or a hash key made up of column(s) with high selectivity can improve performance A UNIQUE key is the most selective, because it does not allow duplicate values in the table's rows for the column(s) that make up the key.

SET METHOD-A tool used in performance tuning. The SET METHOD statement causes the display of the Optimizer's access plan(s) for the SELECT statement(s) that follow the SET METHOD statement.

set operators-Operators that are used to combine the results of two or more SELECT clauses into a single result. The set operators are INTER[SECT], MINUS, and UNION.

single-column index (key)-An index and key made up of only one column.

single-table tablespace-An unpartitioned tablespace that contains one table. The tablespace is a single physical file. Contrast this with multi-table tablespace and with partitioned tablespace.

SMALLINT data type-An RDBMS data type used to store binary values, using less space than is required for the INTEGER data type.

snapshot-A permanent data file created using data from existing table(s). The content of a snapshot is not updated when the underlying table(s) are updated.

SQL-Originally an acronym for Structured Query Language. Now the name of the language most commonly used to access relational databases.

SQL Cache-Configured memory space in which code segments generated by RDBMS are stored for reuse if the same SQL statement is executed again. There are two levels of SQL Cache, Process-Local SQL Cache and Central SQL Cache.

SQLCODE-A field in the SQL Communication Area (SQLCA). Used by RDBMS to return a status code to the application after each execution of an SQL statement.

stable-The characteristic of a table whose content is not updated often.

subquery-A SELECT statement within the WERE or HAVING clause of another SQL statement. A nested SQL statement.

stmt.leng (current) The length, in characters, of the SQL statement.

stmt.text (current) A pointer to the text of the statement.

synchronization-The situation in which data in related tables is consistent. When a data anomaly occurs, tables are no longer in synchronization, and the data content of the tables is not consistent.

table-The relational component that corresponds to a file in non-relational technology. Tables have two forms: hash and non-hash.

tablespace-Physical space that is created explicitly to contain one or more tables in a relational database. If a tablespace is not created explicitly, the table is stored in space allocated by the system. Space allocated by the system is not called a tablespace.

tail (bucket header) The node id of the last in the bucket list (not currently used).

TIME data type-A special-purpose RDBMS data type used to store a three-byte time that can be used in comparisons or computations. The time is formatted as packed decimal in the row in storage, and expanded when read into application memory.

TIMESTAMP data type-A special-purpose RDBMS data type used to store a 10-byte time stamp that can be used in comparisons or computations. The timestamp is formatted as packed decimal in the row in storage, and expanded when read into application memory.

Transaction Processing Routine (TPR)-An application program that processes transactions under control of a transaction monitor. In the context of this publication, the transaction monitor is TP8.

tuning-The process of adjusting database definitions, application implementations, and/or system parameters to improve performance.

UNION-An SQL operator that combines the results of two SELECT clauses. UNION often is used to merge lists of values obtained from several tables. UNION is a set operator; other set operators are INTER and MINUS.

UNIQUE key-An index key or a hash key made up of one or more columns in which no duplicate values are allowed.

unpartitioned tablespace-A tablespace that contains either a single table or multiple tables. The latter case is called a multi-table tablespace. In both cases, the tablespace is a single physical file. Contrast this with partitioned tablespace.

user-An individual who accesses RDBMS databases by means of an application or interactive facility.

VARCHAR data type-An RDBMS data type defined as variable-length character.

view-The definition of a virtual table, made up of all or parts of one or more real tables. A view can hide information from unauthorized users, rearrange information, or combine information from multiple tables to make it easier for users to access the data Because a view is a virtual table that is used to access data from real tables, the data accessed is always up-to-date.

volatile-The characteristic of a table whose content is updated frequently.

VOLUME clause-A clause in the CREATE TABLE or CREATE HASH TABLE statement, used to define the estimated number of rows the table will contain. An accurate VOLUME clause is important in optimizing performance.

WHERE clause-The part of an SQl statement that defines the conditions (restrictions) for selecting data before grouping (if grouping is specified). These restrictions are referred to as search conditions.

workstation-When unqualified, the term workstation refers to any desktop or portable device used to access RDBMS facilities.

Appendix II

Description of Code Generation Support Routines

The code generation support routines called by the Cache Manager component include the following routines:
1. cgen_get_stmt_text routine which given a code token, returns a pointer to the statement text. The routine returns the value of the length of the statement text, in bytes and if an error is encountered, the routine returns a negative number that identifies the error.
2. cgen_get_cursor_name routine which given a code token, returns a pointer to the cursor name, in bytes. If there is no cursor name, the routine returns the value zero. If an error is encountered, it returns a negative number that identifies the error.
3. cgen_get_host_var_buf routine which given a code token, returns a pointer to a memory area containing all the host variable description words from the SQLDA structures. If there are both input and output host variable, the input descriptions precede the output descriptions. This memory is not handled as a string since there may be zero-value bytes contained therein. The routine returns the value of the memory area length used, in words, which is the same as the number of host variables. If an error is encountered, it returns a negative number that identifies the error.
4. cgen_get_code_size routine which given a code token, returns the value of the generated code size in words.

Appendix III

This appendix includes the following sections:
A. Syntax of SQL Cache Utility Commands. Describes the general format of these commands.
B. SQL Cache Utility Commands. Specifies the syntax of each SQL Cache Utility command.
C. Setup and Examples. Illustrates how to use the SQL Cache Utility.

A.1 Syntax of SQL Cache Utility Commands

The syntax of the commands used with the SQL Cache Utility is as follows. Command Format An example of command syntax follows:
CReate_central_CACHE name [-ENTRIES integer] [-WORDS integer[K|M]] [-TABLES integer] [--comment]

The ampersand (&) is used as a command-continuation character. The presence of the ampersand indicates that the command continues on the next input record.

Any command may end with a comment, identified by two preceding hyphens. This general format applies to all of the commands described in the rest of this appendix.

Using Upper and Lower Case

SQL Cache Utility commands are case-insensitive. However, the convention used to present the syntax of these commands is to show mandatory characters in upper case, with optional characters shown in lower case. The underscore, when present, is always an optional character. If optional characters are present, they must appear in the order shown.

Values to be supplied are shown in lower case.

Special Symbol Conventions

When specifying syntax, the following special symbols may be used:

[ ] (brackets) Optional information that may or may not be included.

| (vertical bar) May select one of the choices that appear to the left and right of the vertical bar. If a choice defined by a vertical bar appears within brackets, the choices are optional. If a choice defined by a vertical bar appears outside of brackets, then one of the choices must be selected.

B. SQL Cache Utility Commands

This section specifies the syntax of each command that can be used with the SQL Cache Utility.

The following commands, listed alphabetically, are described herein:

CLEAR_CENTRAL_CACHE, which clears (erases the contents of) the specified Central SQL Cache.

CREATE_CENTRAL_CACHE, which creates a Central SQL Cache.

DELETE_CENTRAL CACHE, which deletes the specified Central SQL Cache, which was created earlier.

DELETE_CODE_IN, which deletes specified code segments from the specified Central SQL Cache.

DISPLAY_CODE_INFO_IN, which displays information about the code segments in the specified Central SQL Cache.

LIST_CACHES, which displays a list of Central SQL Caches.

LIST_MODELS_IN, which lists the names of models for which code segments are contained in the specified Central SQL Cache.

LIST_STATISTICS, which displays statistics associated with the specified Central SQL Cache.

LIST_TABLES_IN, which lists the names of tables for which code segments are contained in the specified Central SQL Cache.

NOTICE_ERRORS and IGNORE_ERRORS, which specify how to handle errors during an execution of the SQL Cache Utility.

OUTPUT, which specifies the destination for output produced by the SQL Cache Utility.

OWNER, which specifies a default UMC that applies to model references in subsequent commands.

QUIT, which terminates execution of the SQL Cache Utility.

RESET_STATISTICS, which resets the statistics associated with the specified Central SQL Cache.

CMD.1 CLEAR_CENTRAL_CACHE

Function

Completely clear the contents of the specified Central Cache, discarding all code segments that were in that cache.

Syntax

CLear_central_CACHE name

Syntax Rules 1. name

The name of the Central SQL Cache to be cleared.

Usage Rules

1. This command does not affect the contents of any data files, or of any Process-Local SQL Cache.

2. This command also resets to zero the cumulative and "high-water mark" statistics for the named Central SQL Cache.

CMD.2 CREATE_CENTRAL_CACHE

Function

Create a Central Cache with the specified name. Application processes that do not explicitly specify the name of the central cache to access will attempt to use the name "_SYS". Therefore, the name "_SYS" must be used to create the central cache accessed by default by application processes. The maximum size of the cache can be specified by entries using the -ENTRIES option and by memory size specified in K words or megawords. The default size is 2 megawords and 2000 entries.

Syntax

CReate_central_CACHE name [-ENTRIES integer] [-WORDS integer[K|M]][-TABLES integer]

Syntax Rules 1. name

The name of the Central SQL Cache to be created. name is a case-insensitive identifier, from one to 12 characters in length, which may contain letters, numbers, and the underscore (_) character The reserved name '_SYS' is the default name for Central SQL Cache. Refer to Usage Rule #1.

2. -ENTRIES integer

The maximum size of the cache, expressed in maximum number of entries. The value specified must be in the range from 10 to 20000, inclusive. The default value is 2000 entries.

3. -WORDS integer[K|M]

The maximum size of the cache, expressed in terms of the maximum memory size.

The size can be specified in either K (1024) words when a 'K' immediately follows the value, or in megawords (1024*1024) when an 'M' immediately follows the value. The value specified must be in the range from 64K words to 100M words, inclusive.

If neither K nor M is specified, the integer size value is treated as an absolute number of words. For example, the value 80000 is treated as 80000 words.

The default value is 2 megawords.

4. -TABLES integer is the maximum number of tables to be represented in the cache. The value specified must be in the range from 100 to 10000, inclusive. The default value is 1000.

NOTES:

1. RDBMS uses the combination of the -ENTRIES and -WORDS values (or their defaults) to define the maximum size of the Central SQL Cache. The more constraining parameter at the time a new code segment is being inserted into cache determines if the code can be added without discarding an older entry or entries.

2. The Central SQL Cache size defined by the -ENTRIES and -WORDS parameters does not cause the specified amount of memory to be reserved for the cache. The size of cache is also constrained by other uses of shared memory. These parameters simply define the maximum size beyond which the Central SQL Cache will not grow.

Usage Rule

1. Application processes that do not explicitly specify the name of the Central SQL Cache will attempt to access a cache named '_SYS'. If the site has application processes that use Central SQL Cache but for which no Central SQL Cache name is specified explicitly, then you must create a Central SQL Cache with the name '_SYS'.

Refer to "Specifying SQL Cache Configuration Parameters" earlier in this appendix for a discussion of how to associate processes with a Central SQL Cache at the Site, Userid, or Process level.

CMD.3 DELETE_CENTRAL_CACHE

Function

Delete the specified central cache.

Syntax

DeLete_central_CACHE name

Syntax Rules 1. name

The name of the Central SQL Cache to be deleted.

This must be the name of a Central Cache that was created earlier using the CREATE_CENTRAL_CACHE command.

CMD.4 DELETE_CODE_IN

Function

Delete the code segments in the specified Central Cache that are associated with a specified model, and optionally with a specified table even if the code is also associated with another table.

Syntax

DeLete_CoDe_in name -MODEL [owner/]model [-TABLE table]

Syntax Rules 1. name

The name of the cache from which code segments are to be deleted.

2. -MODEL [owner/]model

The name of the model for which code segments are to be deleted. If the optional UMC name of the model owner is not specified, the default owner is used. Refer to the description of the OWNER command, later in this appendix, for an explanation of how to specify a default model owner.

3. -TABLE table

The optional name of the table for which code segments are to be deleted. If no table name is specified, code segments for all tables associated with the model are deleted.

Usage Rule

1. This command deletes all code segments associated with the specified model, and optionally with the specified table, even if the code segments are also associated with another table.

CMD.5 DISPLAY_CODE_INFO_IN

Function

Display information about the code segments (SQL text, cursor, owner/table list, size of code and optionally, the code), or a subset of the cede segments, in the specified Central Cache.

Syntax

DiSplay_CoDe_info_in name [output_detail][code_spec]

where:

output_detail=[-COUNT|-BRIEF|-CODE]

code_spec=[-MODEL [owner/]model [-TABLE table]]-CNODE num]

Syntax Rules 1. name

The name of the Central SQL Cache to be searched.

2. output_detail

Determines the amount of detail to be included in the output for each code segment as follows:

-COUNT

If specified, the COUNT option causes only a count of code segments to be displayed.

-BRIEF

If specified, the BRIEF option causes information about each code segment to be displayed, but not the code segment itself. The information displayed includes the CNODE identifier for each code segment. The CNODE identifier can be used as noted above in a later request to display the full code segment.

-CODE

If specified, causes the generated code to be displayed, instead of just information about each code segment.

3. code_spec

Specifies the code segments for which information is to be displayed, as follows:

-MODEL [owner/]model

If specified, determines the model for which code-segment information will be displayed.

If the model is specified but the UMC name of the model owner is not specified, the default owner is used. Refer to the description of the OWNER command later in this appendix for an explanation of how to modify the default model owner.

-TABLE table

If specified, determines the table for which code-segment information will be displayed.

-CNODE num

Indicates that the code segment with the specified CNODE identifier is to be displayed. The SQL Cache Manager uses a CNODE index to identify each code segment in cache. You can determine the CNODE index associated with code segments by using the -BRIEF option. The -MODEL and -CNODE options are mutually exclusive. Also refer to Usage Rule #3.

4. The defaults are as follows:

If no code_spec option is present, information is displayed for every code segment in the named cache.

If no output_detail option is present, -BRIEF is the default.

Usage Rules

1. The display created in response to this command varies depending on the specific options chosen, as explained above, but consists of all or a subset of the following information:

text of the SQL statement
cursor name
list of owner/model/table names
size of code segment
CNODE internal identifier associated with the code segment, if the -BRIEF option is specified
the code, if the -CODE option is specified 2. Because the display may include a significant number of cache entries, the number of entries that fit the specified qualifications is displayed at the beginning of the output. However, during the period of time required to perform this command the contents of the cache may change, and so the number of qualifying entries when the command is completed may be different than the number of qualifying entries at the start of the command. Therefore, the number of entries that qualified at the start of the command that no longer qualify during or at the completion of the command is reported at the end of the output display.

3. As noted in the Syntax Rules for this command, the -BRIEF option causes the CNODE internal identifier associated with the code segment to be displayed. The CNODE number can be used in subsequent commands to request a display of a specific code segment. However, CNODE identifiers are reused, and may change during or between the execution of SQL Cache Utility command. If a referenced CNODE no longer exists, a message is generated to report this situation. If a referenced CNODE has been reused, the code segment displayed may not be the one expected.

CMD.6 LIST_CACHES

Function

List the name(s) of the Central Cache(s) that currently exist in the system.

Syntax

LiSt_CACHEs

CMD.7 LIST_MODELS_IN

Function

List the names of the models, optionally associated with a specified owner, for which code segments are contained in the specified Central Cache Syntax LiSt_MODELs_in name [-OWNER owner]

Syntax Rules 1. name

The name of the Central Cache to be searched.

2. -OWNER owner

The optional name of the model owner. If specified, only models associated with the User Master Catalog (UMC) are listed. Otherwise, all models are listed.

CMD.8 LIST_STATISTICS

Function

Generate and display statistics associated with the specified Central Cache.

Syntax

LiSt_STATiStics name

Syntax Rule 1. name

The name of the Central SQL Cache for which statistics are to be generated.

Usage Rules

1. The following statistics are generated in response to this command:

number of cache hits, misses
number of entries (unique SQL statements) cached
amount of memory currently used for code segments in the cache
maximum amount of memory that has been used for code segments since either the cache was created or statistics were reset
number of cache deletes (explicit delete, clear cache, code replaced because cache was full)
date and time statistics were last reset, if applicable
bucket information (refers to SQL Cache buckets, not hash buckets)
information about table search groups
entry-access information
entry-state inventory
frequency of entry use 2. This command also checks the internal structures associated with the specified cache, and reports any problems found.

3. To obtain statistical information for a Process-Local Cache, use the procedure-call interface described in Appendix IV.

CMD.9 LIST_TABLES_IN
Function
List the names of the tables, optionally associated with a specified model, for which code segments are contained in the specified Central SQL Cache.
Syntax
LiSt_TABLEs_in name [-MODEL [owner/]model]
Syntax Rules
1. name
The name of the Central SQL Cache to be searched.
2. -MODEL [owner/]model
The optional name of the model. If specified, only tables associated with this model are listed. Otherwise, all tables are listed.
If the model is specified but the User Master Catalog (UMC) name of the model owner is not specified, the default owner is used. Refer to the description of the OWNER command later in this appendix for an explanation of how to modify the default model owner.
CMD.10 NOTICE_ERRORS and IGNORE_ERRORS
Function
Determine whether the SQL Cache Utility will terminate in the event of an error or will continue processing.
Syntax
NOTICE_ERRORS
IGNORE_ERRORS
Usage Rules
1. The default state when the utility begins execution is NOTICE_ERRORS. In this state, the utility terminates whenever an error of any type (e.g., in the input parameters) is encountered.
2. When the IGNORE_ERRORS state is set, the utility continues execution even when errors are encountered.
3. The NOTICE_ERRORS command can be used at any point in a utility session to return to the default mode after IGNORE_ERRORS has been used.
CMD.11 OUTPUT
Function
Specify the destination to which subsequent output generated by the SQL Cache Utility, excluding error messages, is to be sent.
Syntax
OUTPUT path|filecode|-RESET [-OUT_ONLY][-APPEND]
Syntax Rules
1. path|filecode
The pathname (catalog/file string) or file code to which subsequent utility output is to be directed.
If a pathname is specified and the file does not already exist, RDBMS will attempt to create the file.
The file code is specified in the form FC*xx, where xx is the desired filecode. The file associated with the filecode must be a sequential file and must be pre-allocated with write permission.
Not used when the -RESET option is specified.
2. -RESET
Used to restore the default output settings, as described below in Usage Rules. -RESET takes precedence over -OUT_ONLY.
3. -OUT_ONLY
Prevents a copy of the input directives from being included in the output, unless an error (syntax or other) results from the command. -OUT_ONLY is overridden by -RESET.
4. -APPEND
Causes the output to be appended to the previous content of the specified output destination. If the -APPEND option is not present, the previous content of the destination is overwritten unless the destination is associated with SYSOUT.
Usage Rules
1. Error messages always go to P*. This destination cannot be overridden using the OUTPUT command.
2. The default output destination is P*. A copy of the input directives is included unless an OUTPUT command with the -OUT_ONLY option is entered.
3. The command summary, which is written to a report file, is not affected by this command
4. If an error occurs when RDBMS attempts to access the file specified in the OUTPUT command, an error is reported and the default output settings are restored.
5. The OUTPUT command may be used more than once in a session.
CMD.12 OWNER
Function
Specify a default owner UMC qualifier, which will apply to model references in subsequent commands in the current SQL Cache Utility session.
Syntax
OWNER owner
Syntax Rule
1. owner
The UMC to be used in subsequent commands.
Usage Rules
1. If the OWNER command is not used, command references to a model must be qualified explicitly with an owner.
2. Explicit specification of an owner in a subsequent command overrides this setting, for that command only.
3. The OWNER command may be used more than once in a session.
4. The SQL Cache Utility does not check to determine if the specified owner exists.
CMD.13 QUIT
Function
Terminate the SQL Cache Utility session.
Syntax
Quit
Usage Rule
1. Use of the QUIT command is optional. The SQL Cache Utility will terminate after processing all of the commands in the input job stream, even if the QUIT command is not present.
CMD.14 RESET_STATISTICS
Function
Reset to zero the accumulated and "high-water mark" statistics for the specified Central SQL Cache.
Syntax
ReSet_STATiStics name
Syntax Rule
1. name
The name of the Central SQL Cache for which statistics are to be reset.
C. Setup and Examples
This section describes the setup requirements for the SQL Cache Utility, and includes two examples of how to use this utility.
Setup for SQL Cache Utility
The commands to be processed during a SQL Cache Utility session can be supplied in either of two ways:
1. In a file with filecode I*. In this case, the input job stream will be similar to the following:
$ IDENT <ident image>
$ SELECT &SYSTEM/PROFILE.PROD/INTEREL $ SELECT &DR008P/JCL/SCUP.JCL
<utility commands here>
2. In a perm file that is allocated via $ PRMFL image in the input job stream.
The commands in the perm file may be in either ASCII or BCD.
Authorization Required
Because the SQL Cache Utility deals with shared system resources, invocation of the utility requires a particular level of authorization. On a system that does not use a System Security Manager (SSM), the $ PRIVITY image is required in the input job stream. On a system that uses SSM, invocation of the utility requires the admin_1 linking key.
SQL Cache Utility Output
The SQL Cache Utility produces two output reports on SYSOUT:
Report 1 Contains the command and the output produced by the command. The contents of this report may be directed to a file by using the OUTPUT command described earlier in this appendix
Report 2 Contains the command execution summary; that is, each command that was executed and the overall result (success or failure) of command execution. This report is always sent to SYSOUT, and may not be redirected.

EXAMPLES

Example #1
The following example deletes a Central SQL Cache with the name 'CACHE1' if one exists, then creates a new Central SQL Cache with that name.
$ SELECT &SYSTEM/PROFILE.PROD/INTEREL
$ SELECT &DR008P/JCL/SCUP.JCL
IGNORE_ERRORS
DELETE_CENTRAL_CACHE CACHE1
NOTICE_ERRORS
CREATE_CENTRAL_CACHE CACHE1-ENTRIES 2000 -WORDS 6M
This example uses the IGNORE_ERRORS command so that the following DELETE command will not cause the utility to terminate if no Central SQL Cache with the name 'CACHE1' exists. After the DELETE command, the command NOTICE_ERRORS is used to return the utility to the default state of terminating if an error occurs.
A new Central SQL Cache named 'CACHE1' is created with a maximum size of 2000 entries and a maximum memory size of 6 megawords.

Example #2
The following example searches the Central SQL Cache named 'CACHE1' and deletes all code segments that reference table 'T1' within the model 'MOD2', which belongs to owner (Userid) 'USER2'. Note that the use of the OWNER command eliminates the need to qualify subsequent references to 'MOD2' with the owner name.
$ SELECT &SYSTEM/PROFILE.PROD/INTEREL
$ SELECT &DR008P/JCL/SCUP.JCL
OWNER USER2
DELETE_CODE_IN CACHE1 -MODEL MOD2 -TABLE T1
OUTPUT USER2/RPT/CACHE1_STATS -OUT_ONLY
LIST_STATISTICS CACHE1
OUTPUT -RESET
RESET_STATISTICS CACHE1
LIST_TABLES_IN CACHE1 -MODEL MOD2
The above example first establishes the default model owner as Userid "USER2".

The next command deletes all code segments in CACHE1 that are associated with USER2's model MOD2 and table T1.
The OUTPUT command then specifies that subsequent output is to be sent to the pathname 'USER.2/RPT/CACHE1_STATS'. The -OUT_ONLY option is used to prevent a copy of the input command being included in the output.
The LIST_STATISTICS command then directs that statistics for CACHE1 are to be written to the specified file.
The OUTPUT -RESET command returns the out put destination to its default state, which is that all output, including copies of input commands, is sent to P*.
Next the RESET_STATISTICS command is used to clear the statistics for CACHE1.
The final command requests a list of all tables associated with the model "MOD2" that have code segments in CACHE1.

APPENDIX IV

A. Specifying SQL Cache Configuration Parameters
The configuration parameters associated with SQL Cache are described below. The majority of these configuration parameters apply to Central SQL Cache; however, some apply to Process-Local SQL Cache
A site can create one or more Central SQL Caches. (Refer to "Managing Central SQL Cache" for a discussion of how to decide whether to use multiple central caches. "Using the SQL Cache Utility" later in this appendix describes how to create a Central SQL Cache.
A user can create a Central SQL Cache and accept the default configuration parameters. However, typically the user will want to specify configuration parameters that are tailored for the site's application environment. The configuration parameters that define the characteristics of a Central SQL Cache are contained in Timesharing ASCII files at locations known to, or specified to, RDBMS. If the user wants to modify the default configuration parameters, the user needs to place the cache parameters in these files before creating a Central SQL Cache.
Values for configuration parameters can be specified at three hierarchical levels. The relationships among these levels determine how, or if, a parameter value at one level can override a value for the same parameter at a different level.
The rest of this appendix contains the following sections:
B. Structure of Configuration Parameters. Explains the four levels at which configuration parameters are specified and how parameters at each level relate to the other levels.
C. Configuration-Parameter Files. Specifies the file locations at which configuration parameters must be stored.
D. Specifying Configuration Parameters. Specifies the syntax and use of each parameter.
E. Configuration Parameter Examples.
B. Structure of Configuration Parameters
The structure described below is associated with the definition and use of SQL Cache configuration parameters.
Configuration Parameter Levels
Configuration parameters associated with SQL Cache are defined at four levels:
1. Default (coded in the software)
2. Site (defined explicitly)
3. Userid (defined explicitly)
4. Process (defined explicitly)
Rules for Overriding Configuration Parameters
Configuration-parameter values defined at these four levels have the following hierarchical relationships:
A parameter value that is defined explicitly at the Site level overrides the default value coded in the RDBMS software.

A parameter value that is defined explicitly at the Userid level overrides the value for the same parameter defined at the Site level, but only for processes that operate under that Userid.

A parameter value that is defined explicitly at the Process level overrides the value for the same parameter defined at the Userid level—and therefore also at the Site level—but only for that specific process (activity).

The user not need to specify a value for every configuration parameter at each of the possible levels. For example, the user could specify a value for one configuration parameter at the Site level but not at an) other level, to apply to all Userids and Processes. The user could specify a value for another configuration parameter at the Userid level but not at the Site level. If no value is specified for a particular configuration parameter, RDBMS uses the system default value.

Limiting Override

There are two exceptions to the general override rules stated above.

1. The RDBMS software prohibits the override of certain parameter values, either because an override would be meaningless or because an override would cause undesirable effects. These cases are noted in the detailed specifications of configuration parameters.

2. The site can limit override by defining specific parameter values that cannot be overridden.

The general syntax used to specify configuration parameters is:

PREFIX KEYWORD=value.

Override can be limited by using the following alternate form when specifying a value for a configuration parameter:

PREFIX KEYWORD:value.

In this case, the equal sign (=) in the general syntax of KEYWORD=value is replaced by the colon. The use of the colon indicates that this value cannot be overridden at a subsequent level.

For example, the user might want to specify some parameter values at the Site level that cannot be overridden at either the Userid or Process level, because these parameters are important to the operation of SQL Cache for the site as a whole. In this case, the user can use the "colon" format shown above to specify the Site-level parameters. If values for the same parameters are later specified at the Userid or Process level, those values will be ignored.

The user might want to specify other parameter values at the Userid level that cannot be overridden at the Process level. Limiting override at the Process level is meaningless, because no other level overrides the Process level.

To illustrate the effect of override, Table 1 shows a set of SQL Cache configuration parameters, then Table 2 shows how the override rules are used to determine the value used by RDBMS for each configuration parameter. Note that "no override" is specified for parameter E at the site level, and "no override" is specified for parameter F at the Userid level.

TABLE 1

Example SQL Cache Configuration Parameters

| Site-Level File | Userid-Level File | Process-Level File |
| --- | --- | --- |
| A = 1 | A = 2 | A = 3 |
| C = 1 | D = 2 | E = 3 |
| D = 1 | E = 2 | F = 3 |
| E : 1 | F : 2 | H = 3 |
| F = 1 | G = 2 | |

TABLE 2

Effects of SQL Cache Configuration Parameter Override

| Configuration Parameter | Coded Default | Site-Level Value | Userid-Level Value | Process-Level Value | Value Used |
| --- | --- | --- | --- | --- | --- |
| A | 0 | 1 | 2 | 3 | 3 |
| B | 0 | | | | 0 |
| C | 0 | 1 | | | 1 |
| D | 0 | 1 | 2 | | 2 |
| E | 0 | 1 | ignored | ignored | 1 |
| F | 0 | 1 | 2 | ignored | 2 |
| G | 0 | | 2 | | 2 |
| H | 0 | | | 3 | 3 |

C. Configuration Parameter Files

Configuration parameters for SQL Cache are stored in Timesharing ASCII files. The locations of the configuration parameter files are shown in Table 3

TABLE 3

Locations of SQL Cache Configuration Parameter Files

| Level | Applicable Scope | Location |
| --- | --- | --- |
| Software default | Items for which values are not set explicitly | Internal to software; not accessible to the site |
| Site | System | SYS_SITEDATA/_INTEREL/ENVIR (see NOTE) |
| Userid | Processes executing under Userid | umc/_INTEREL/ENVIR |
| Process | Activity | umc/_INTEREL/file or filecode fc where file or fc is specified on the $ RUN JCL statement for the activity, as defined below in "Using SQL Cache Configuration Parameters" |

A single file defines the Site-level configuration parameters. Multiple files can be used to define Userid-level configuration parameters, with each of these files located under the associated UMC. Multiple files can also be used to define Process-level configuration parameters.

The files shown in Table 3 must be established by the site. If the user wants to specify parameters at the Site and/or Userid and/or Process level when creating a Central SQL Cache, the user should create the associated files and insert the appropriate parameters before creating a Central SQL Cache as described in Appendix III.

Using Configuration Parameters

Each time a process that accesses RFM files is put into execution, RDBMS software accesses the values in the configuration-parameter files for the Site and Userid levels if these files have been established. The values actually used by RDBMS to control SQL Cache depend on:

1. which values have been specified at each level,
2. which values have been specified to prohibit override,
3. whether the $ RUN JCL statement associated with the process points to a file that contains overrides for Process-level configuration parameters.

Table F-2 earlier in this appendix illustrates how the overrides work at each level. Process-level override is a special case, because the Process-level values are activated by the $ RUN associated with the activity (process) to which the values apply. If the $ RUN does not point to a file with Process-level values, no override occurs at Process level.

The $ RUN must have one of the forms shown in Examples #1 and #2.

Example #1

$ RUN RUFILE=xxx, . . . ,
$ ETC IENV=myenv

Example #1 illustrates how to specify that the Process-level configuration parameter values are contained in a file at umc/_INTEREL/myenv.

Example #2

$ RUN RUFILE=xxx, . . . ,IENV=FC*xx, . . .
$ PRMFL xx,R,S, . . .

Example #2 illustrates how to specify that the Process-level configuration parameter values are contained in a file with file code xx.

The values in the configuration-parameter files can be changed at any time, including while processes that use RFM files are in execution. However, changing configuration-parameter values does not affect processes that were already in execution. Any process that was already in execution when the configuration values were changed continues to use the values that were in effect when the process was initiated.

D. Specifying Configuration Parameters

The configuration parameters associated with SQL Cache are specified as described in the following subsections.

Syntax Conventions

The configuration parameters to be used with SQL Cache are specified using a technique called "environment variables." Environment variables are used to define configurations in a number of commodity software systems. The variables are specified and stored in files. Later, the software accesses the variables and uses those values to establish its environment; that is, to define its configuration and control its operation The RDBMS implementation of environment variables uses the general syntax:

prefix keyword =|: value

NOTE.: Input is terminated by the end of the line; there is no continuation capability.

Using Upper and Lower Case

Required prefixes and keywords are shown in upper case for simplicity. However, both the prefix and keyword are case insensitive. Values to be supplied are shown in lower case.

Special Symbol Conventions

When specifying syntax, the following special symbols may be used:

[ ] (brackets) Optional information that may or may not be included.

| (vertical bar) May select one of the choices that appear to the left and right of the vertical bar. If a choice defined by a vertical bar appears within brackets, the choices are optional. If a choice defined by a vertical bar appears outside of brackets, then one of the choices must be selected.

Syntax Rules 1. prefix

Defines the area of RDBMS software to which the configuration parameter applies. For SQL Cache parameters, the prefix is 'SQL_CACHE'.

2. keyword

Identifies which configuration parameter to set.

3. =|:

Either the equal sign (=) or the colon (:) must be present.

The equal sign indicates that the parameter value can be overridden by a parameter value at a subsequent level.

The colon indicates that the parameter value cannot be overridden.

NOTE: The equal sign (=) is used in the following syntax descriptions. In each case a colon (:) could be used instead, to prohibit override.

4. value

Specifies the value for the configuration parameter. The form of the value may vary depending on the specific parameter.

Some common types of values are integers (e.g., -2, 0, 5, 1500), YES/NO, and string values. The software that references the parameter determines the values that can be supplied for that parameter.

NOTE: The user can assign a value to any configuration parameter, whether that parameter is used by the software or not. Assigning a value to an unused parameter is not considered to be an error, and is not reported as an error.

Errors

Unrecognized prefixes and keywords (those not used by the software) are processed as comments. Values that follow the equal sign or colon are subject to error checking, and an invalid value causes the following error message to be returned.

(Interel Config) Invalid value for config-item where config-item is the configuration parameter being defined.

D.1 Specifying the CENTRAL_CACHE_NAME Parameter

Function

Specify the Central SQL Cache to be used.

Syntax

SQL_CACHE CENTRAL_CACHE_NAME=name

Syntax Rules 1. name

The name of an existing Central SQL Cache, which was created by using the SQL Cache Utility command CREATE_CENTRAL_CACHE (described in "Using the SQL Cache Utility" later in this appendix)

2. If this configuration parameter is not specified, the default Central SQL Cache name of '_SYS' is assumed.

Usage Rules

1. If this configuration parameter is specified at the Site level, the named SQL Cache is used by all processes unless overridden at the Userid or Process level.

D.2 Specifying the MAX_LOCAL_CACHE_ENTRIES Parameter

Function

Define the maximum number of entries to be cached simultaneously in Process-Local SQL Cache.

Syntax

SQL_CACHE_MAX_LOCAL_CACHE_ENTRIES= integer

Syntax Rules 1. integer

The maximum number of unique SQL statements (code segments) to be cached simultaneously. Must be a value in the range from 10 to 20000, inclusive.

2. If this configuration parameter is not specified, the default value of 2000 code segments is used.

Usage Rules

1. The size of a code segment (entry) in SQL Cache varies, so cache size in words cannot be predicted based on the number of entries allowed.

This parameter works in conjunction with the MAX_LOCAL_CACHE_WORDS parameter (described next) to determine the maximum size of Process-Local SQL Cache.

2. If a value for this configuration parameter is specified at the Site level and not overridden at the Userid or Process level, the value determines the size of all Process-Local SQL Caches in the system.

3. If a value for this configuration parameter is specified at the Userid level and not overridden at the Process level, the value determines the size of the Process-Local SQL Cache(s) associated with all processes that run under that Userid.

4. If a value for this configuration parameter is specified at the Process level, the value determines the Process-Level SQL Cache for that process (activity).

D.3 Specifying the MAX_LOCAL_CACHE_WORDS Parameter

Function

Specify the maximum size of Process-Local SQL Cache to be used by a process, by specifying the maximum number of words to be used for that cache.

Syntax

SQL_CACHE MAX_LOCAL_CACHE_WORDS=integer[K|M]

Syntax Rules 1. integer[K|M]

Specifies the maximum size of the cache, expressed in terms of the maximum memory size. Additional memory used by INTEREL for tables, counters, etc., is not included in this limit.

The size can be specified in either K (1024) words when a 'K' immediately follows the value, or in megawords (1024*1024) when an 'M' immediately follows the value. The value specified must be in the range from 20K words to 64M words, inclusive.

If neither K nor M is specified, the integer size is treated as an absolute number of words. For example, the value 30000 is treated as 30000 words.

2. If the configuration parameter is not specified, the default value of 2M (2 megawords) is used.

Usage Rules

1. This parameter works in conjunction with the MAX_LOCAL_CACHE_ENTRIES parameter (described earlier) to determine the maximum size of Process-Local SQL Cache.

The size of Process-Local SQL Cache will be no larger than the more limiting of these two parameters. That is, if the defined maximum number of words can contain more than the defined maximum number of cache entries, then the maximum number of entries is the limiting factor. If the defined maximum number of entries cannot fit within the defined maximum number of words, then the maximum number of words is the limiting factor.

2. If a value for this configuration parameter is specified at the Site level and not overridden at the Userid or Process level, the value determines the size of all Process-Local SQL Caches in the system.

3. If a value for this configuration parameter is specified at the Userid level and not overridden at the Process level, the value determines the size of the Process-Local SQL Cache(s) associated with all processes that run under that Userid.

4. If a value for this configuration parameter is specified at the Process level, the value determines the Process-Level SQL Cache for that process (activity).

5. An increase in the size specified for Process-Local SQL Cache may result in the need to raise the CSSIZE specification on the $ RESOURC image in the JCL for the affected job(s).

D.4 Specifying the MAX_CODE_SEG_K Parameter

Function

Specify the maximum size of a code segment to be store(i in SQL Cache.

Syntax

SQL_CACHE MAX_CODE_SEG_K=integer

Syntax Rules 1. integer

Specifies the maximum size, in K (1024) words, of a segment of generated code.

The value specified must be in the range from 20 to 100, inclusive.

2. If this parameter is not specified, the default value of 20 (K words) is used.

Usage Rules

1. This value defines the size of the buffer used during code generation. This value does not affect the amount of memory used to store the generated code segment in SQL Cache.

2. If code generation for a specific SQL statement would result in a code segment larger than the specified maximum, code is not generated for that SQL statement.

It is IMPORTANT to note that a value for this configuration parameter may be specified only at the Site level. The Site-level value cannot be overridden. Any value for this parameter specified at the Userid or Process level is ignored.

D.5 Specifying the CENTRAL_CACHE_UPDATE Parameter

Function

Specify whether process(es) are to update Central SQL Cache.

Syntax

SQL_CACHE CENTRAL_CACHE_UPDATE=Yes|No

Syntax Rules

1. Yes|No

If Y[es], specifies that process(es) are to update (store code segments in) Central SQL Cache. If N[o], specifies that process(es) are not to update Central SQL Cache.

2. The default for this configuration parameter is Yes.

Usage Rules

1. Control is provided independently over whether a process (or processes):
   updates Central SQL Cache
   uses (accesses code segments in) Central SQL Cache The value of the CENTRAL_CACHE_UPDATE configuration parameter affects only the updating of Central SQL Cache.

The value of the USE_CENTRAL_CACHE parameter (described next) affects only the use of Central SQL Cache.

2. If a value for this configuration parameter is specified at the Site level and not overridden at the Userid or Process level, the value controls the execution of all processes.

3. If a value for this configuration parameter is specified at the Userid level and not overridden at the Process level, the value controls the execution of all processes that run under that Userid.

4. If a value for this configuration parameter is specified at the Process level, the value controls the execution of that specific process.

D.6 Specifying the USE_CENTRAL_CACHE Parameter

Function

Specify whether process(es) are to use Central SQL Cache.

Syntax

SQL_CACHE USE_CENTRAL_CACHE=Yes|No

Syntax Rules

1. Yes|No

If Y[es], specifies that process(es) are to use (access code segments in) Central SQL Cache. If N[o], specifies that process(es) are not to use Central SQL Cache.

2. The default for this configuration parameter is Yes.

Usage Rules

1. Control is provided independently over whether a process (or processes):
   uses Central SQL Cache
   updates (stores code segments in) Central SQL Cache
   The USE_CENTRAL_CACHE configuration parameter affects only the use of Central SQL Cache.
   The CENTRAL_CACHE_UPDATE parameter (refer to the preceding description) affects only the updating of Central SQL Cache.
2. If a value for this configuration parameter is specified at the Site level and not overridden at the Userid or Process level, the value controls the execution of all processes.
3. If a value for this configuration parameter is specified at the Userid level and not overridden at the Process level, the value controls the execution of all processes that run under that Userid.
4. If a value for this configuration parameter is specified at the Process level, the value controls the execution of that specific process.

E. Configuration Parameter Examples

The following related examples illustrate how to use configuration parameters.

Example #1

Site Level Configuration

SQL_CACHE CENTRAL_CACHE_NAME=_SYS

SQL_CACHE MAX_LOCAL_CACHE_ENTRIES= 2000

SQL_CACHE MAX_LOCAL_CACHE_WORDS: 20M

This example defines the Central SQL Cache name to be '_SYS', which would have been the default name if this parameter had been omitted.

The configuration specifies that the maximum number of entries in Process-Local SQL Cache will be 2000. However, the equal sign (=) specifies that this maximum can be overridden by a parameter value at the Userid or Process level.

The maximum amount of memory to be used for generated code in Process-Local SQL Cache will be 20 megawords. The colon (:) specifies that this maximum cannot be overridden at the Userid or Process level.

Example #2

Userid or Process Level Configuration

SQL_CACHE CENTRAL_CACHE_NAME= CACHE1

SQL_CACHE CENTRAL_CACHE_UPDATE=NO

SQL_CACHE MAX_LOCAL_CACHE_ENTRIES= 1000

This example specifies that the Central SQL Cache named 'CACHE1' is to be used instead of the default cache named '_SYS'.

The configuration specifies that code segments generated by process(es) to which this configuration applies are not to be inserted into Central SQL Cache.

The configuration overrides the Site specification for maximum number of Process-Local SQL Cache entries, replacing the Site-level value of 2000 with the value of 1000.

Because Example #2 is related to Example #1 and Example #1 specifies the parameter MAX_LOCAL_CACHE_WORDS with "no override," Example #2 cannot use MAX_LOCAL_CACHE_WORDS to change the maximum local cache size at the Userid or process level.

APPENDIX V

A. INTRODUCTION TO APPLICATION VISIBLE INTERFACE

The following programmatic interface to certain RDBMS functions is associated with the use of the Multicache System of the present invention. This interface provides access to call routines in the RDBMS Support Library.

The following command calls are described in this appendix:

X_SQL_CACHE_GEN_LOCAL_REPORT, which is used to generate statistics for Process-Local SQL Cache X_SQL_CACHE_GEN_CENTRAL_REPORT, which is used to generate statistics for Central SQL Cache X_SQL_CACHE_RESET_LOCAL_STAT, which is used to reset statistics for Process-Local SQL Cache X_SQL_CACHE_RESET_CENTRAL_STAT, which is used to reset statistics for Central SQL Cache X_SQL_CACHE_CLEAR_LOCAL_CACHE, which is used to clear the contents of Process-Local SQL Cache NOTES:
1. A process that uses these calls can access only its own Process-Local SQL Cache: the process cannot access the Process-Local SQL Cache associated with any other process.
2. A process that uses these calls can access only the Central SQL Cache with which it has been associated using the configuration parameters described in Appendix IV: the process cannot access any other Central SQL Cache that may exist in the system.

Authorization Required

Two of these procedure calls—X_SQL_CACHE_GEN_CENTRAL_REPORT and X_SQL_CACHE_RESET_CENTRAL_STAT—affect Central SQL Cache, and can be executed only with authorization. To execute either of these two calls, the calling domain must have the admin_1 linking key. This linking key is assigned via Linkage Editor command in the job stream of the program that includes the restricted procedure call(s).

If the calling domain does not have the required authorization, an "insufficient authorization" status is returned to the process and the call is not executed. Refer to the syntax descriptions of these two calls for additional information.

Procedure Call Input Data Structure

The procedure calls described in this section require an input data structure definition similar to (or a subset of) the following example (in COBOL-85 SQL):

01 STATUS COMP-6.
01 FILECODE PIC X(2).
01 APPEND COMP-6.

B. DESCRIPTION OF COMMANDS

CMD.1. X SQL_CACHE_GEN_LOCAL_REPORT

Function

Causes the generation and display of statistics for Process-Local SQL Cache of the process that executes the call.

Syntax

CALL "X_SQL_CACHE_GEN_LOCAL_REPORT" USING status, filecode, append.

Syntax Rules

1. The subroutine name must be specified in upper case, exactly as shown.

2. The following values may be returned in status:
 0 successful
 1 service not reached (CLIMB to cache service domain failed)
 2 service not completed
 10 error opening file for write or append
 11 error writing file
 12 error closing file
3. filecode indicates the location of the file in which the statistics are to be stored.
4. append defines whether the new statistics are to be:
 1 appended to the file content
 0 overwritten, destroying the file content
Usage Rule
1. The statistics returned reflect the use of the Process-Local SQL Cache of the calling process.

CMD.2 X_SQL_CACHE_GEN_CENTRAL_REPORT
Function
Causes the generation and display of statistics for the Central SQL Cache associated with the process that executes the call.
Syntax
 CALL "X_SQL_CACHE_GEN_CENTRAL_REPORT" USING status, filecode, append.
Syntax Rules
1. The subroutine name must be specified in upper case, exactly as shown.
2. The following values may be returned in status:
 0 successful
 1 service not reached (CLIMB to cache service domain failed)
 2 service not completed
 3 insufficient authorization (see Usage Rule #1)
 5 could not access Central SQL Cache
 10 error opening file for write or append
 11 error writing file
 12 error closing file
 13 error allocating memory buffer
3. filecode indicates the location of the file in which the statistics are to be stored.
4. append defines whether the new statistics are to be:
 1 appended to the file content
 0 overwritten, destroying the file content
Usage Rules
1. Refer to "Authorization Required" in the introduction earlier in this appendix for an explanation of the authorization needed to execute this procedure call. If the required authorization is not present, the value 3 (insufficient authorization) is returned in status and the requested report is not generated.
2. The statistics returned reflect the use of the Central SQL Cache that has been associated with the calling process at the default, Site, Userid, or Process level, as described in the section on "Specifying Configuration Parameters" in Appendix IV.

CMD.3 X_SQL_CACHE_RESET_LOCAL_SAT
Function
Resets the statistics for the Process-Local SQL Cache of the process that executes the call.
Syntax
 CALL "X_SQL_CACHE_RESET_LOCAL_STAT" USING status.

Syntax Rules
1. The subroutine name must be specified in upper case, exactly as shown.
2. The following values may be returned in status:
 0 successful
 1 service not reached (CLIMB to cache service domain failed)
 2 service not completed
Usage Rules
1. Statistics are reset for the Process-Local SQL Cache of the calling process.
2. Statistics for any Central SQL Cache associated with the calling process are not affected.

CMD.4 X_SQL_CACHE_RESET_CENTRAL_STAT
Function
Resets the statistics for the Central SQL Cache associated with the process that executes this call.
Syntax
 CALL "X_SQL_CACHE_RESET_CENTRAL_STAT" USING status.
Syntax Rules
1. The subroutine name must be specified in upper case.
2. The following values may be returned in status:
 0 successful
 1 service not reached (CLIMB to cache service domain failed)
 3 insufficient authorization (see Usage Rule #3)
 2 service not completed
 5 could not access Central SQL Cache
Usage Rules
1. Statistics are reset for the Central SQL Cache that has been associated with the calling process at the default, Site, Userid, or Process level, as described in the section on "Specifying Configuration Parameters" in Appendix IV.
2. Statistics for the Process-Local SQL Cache of the calling process are not affected.
3. Refer to "Authorization Required" in the introduction earlier in this appendix for an explanation of the authorization needed to execute this procedure call. If the required authorization is not present, the value 3 (insufficient authorization) is returned in status and the specified statistics are not reset.

CMD.5 X_SQL_CACHE_CLEAR_LOCAL_CACHE
Function
Clears (discards) the content of the Process-Local SQL. Cache associated with the process that executes the call.
Syntax
 CALL "X_SQL_CACHE_CLEAR_LOCAL_CACHE" USING status.
Syntax Rules
1. The subroutine name must be specified in upper case.
2. The following values may be returned in status:
 0 successful
 1 service not reached (CLIMB to cache service domain failed)
 2 service not completed
Usage Rule
1. All code segments in the Process-Local SQL Cache are discarded.
2. Code segments in Central SQL Cache are not affected.

Express Mail Label No.
EI957001144US
52-3129

-102-

APPENDIX VI

CONTROL STRUCTURES USED BY MULTICACHE SYSTEM

```
/*******************************************************************
    Local Cache Structures
    C Language Representation
    (Tuned for 4-byte words, 9 bits per byte)

*******************************************************************/
#define CHAR_BIT  9
define BYTE2     CHAR_BIT*2 typedef signed int      NODE_REF;   /* signed since NODE_REF-valued
funcs may be neg for err */
typedef signed int      BUCKET_REF; /* signed since NO_BUCKET is
negative */
typedef void            *CODE_REF;
/*******************************************************************/ typedef struct
{
    int         next        :BYTE2,
                prev        :BYTE2;
    CODE_REF    code_token;
    int         model_token;
    int         num_wds_code;
    unsigned    hash_intermed;
    unsigned    cmd_type_num_host;  /* cmd type code, num host var
*/
    BUCKET_REF  bucket;
    int         num_touches;
} CACHE_NODE;

/*******************************************************************/
/*
    The following structure is one word in length so that offset
calculations
    into arrays of this structure are most efficient (i.e.,
subscript is word offset).
*/
typedef struct
{
    int   next  :BYTE2,
          prev  :BYTE2;
} MRU_NODE;
/*******************************************************************/ typedef struct
{
    NODE_REF     head,
                 tail;
    unsigned int count   :BYTE2;
} BUCKET_HEADER;
```

Express Mail Label No.
EI957001144US
52-3129

-103-

```
/******************************************************************
    Central Cache Structures
    C Language Representation (does not imply implementation in this
language)
5   (Tuned for 4-byte words, 9 bits per byte)

******************************************************************/ define MAX_NUM_CENTRAL_CACHE 32
10  #define MAX_CHAR_CACHE_NAME    12
    #define MAX_CHAR_ODI_ENV_NAME  12
    #define NUM_CHAR_STI           12
    #define MAX_UNIQUE_CHAR_TABLE  12
    #define MAX_CHAR_MODEL         12
15  #define MAX_CHAR_OWNER         12
    /******************************************************************/
    typedef struct
    {
        char    id[8];
20      struct qmon_block
        {
            int    :36;
            int    :36;
        };
25      struct snumb
        {
            int bin   :30;
            int       :6;
        };
30      unsigned int   kpx :BYTE2;
        struct flag1
        {
            unsigned int   read_only :1;
            unsigned int             :35;
35      };
    } CSC_GATE_BLOCK;
    struct CACHE_DIR
    {
        char    id[8];      /* to help find in memory images or dumps */
40      struct flag2
        {
            unsigned int ocm_delete_in_progress :1;
        };
        unsigned int rotation_set_index;
45      struct ent[MAX_NUM_CENTRAL_CACHE-1]
        {
            char    name[MAX_CHAR_CACHE_NAME];  /* name of cache */
            int     state;
            struct create_date
50          {
                char   month[2];
                char   day[2];
                char   year[4];
            };
55          struct create_time
```

Express Mail Label No.
EI957001144US
52-3129

-104-

```
             {
                 char    hour[2];
                 char    min[2];
                 char    sec[2];
 5           };
             char    odi_name[MAX_CHAR_ODI_ENV_NAME];  /* currently unused
     */
             char    dir_sti[NUM_CHAR_STI];   /* sw version identifier */
             void    *cache_data_;    /* temp put $ back */
10           void    *cond_id_;
         };
     };
     /*******************************************************************/

15   struct CACHE_DATA
     {
         char    id[8];    /* "CACHDATA" */
         unsigned int    segment_in_use  :1;
         char    cache_name[MAX_CHAR_CACHE_NAME];
20       struct create_date2    /* date and time useful when CACHE_DATA
     seg outlasts */
         {                       /*   CACHE_DIR entry                      */
             char    month[2];
             char    day[2];
25           char    year[4];
         };
         struct  create_time2
         {
             char    hour[2];
30           char    min[2];
             char    sec[2];
             char    fill[2];
         };
         CSC_GATE_BLOCK    gate;
35       struct   config
         {
             unsigned int max_wds_cache;
             unsigned int max_entries_cache;
             unsigned int num_buckets;
40           unsigned int num_tmo_buckets;
             unsigned int num_tmo_entries;
         };
         struct    stats
         {
45           int num_wds_cache;
             int num_used_entries;
             int max_wds_used;        /* "high water" mark */
             int max_entries_used;    /* "high water" mark */
             int num_hit;
50           int num_miss;
             int num_error;
             int num_insert;
             int num_del_repl;    /* # of deletes due to replacement */
             int num_del_exp;     /* # of explicit deletes */
55           int num_del_ddl;     /* # of deletes due to DDL */
```

Express Mail Label No.
EI957001144US
52-3129

-105-

```
            struct  date_stats_reset
            {
                char  month[2];
                char  day[2];
 5              char  year[2];
                char  fill1[2];
            };
            struct  time_stats_reset
            {
10              char  hour[2];
                char  minute[2];
                char  second[2];
                char  fill2[2];
            };
15          unsigned int  reason_stats_reset;
            struct  flag3
            {
                unsigned int  cache_delete_in_progress  :1;
                unsigned int  stats_were_reset          :1;
20          };
            struct  info
            {
                unsigned int  mru_head        :BYTE2; /* array index */
                unsigned int  mru_tail        :BYTE2;
25              unsigned int  tmo_free_head   :BYTE2;
                unsigned int  tmo_free_count  :BYTE2;
            };
        };

30  };
    /*****************************************************************/ typedef struct
    {
35      unsigned int  head   :BYTE2;
        unsigned int  tail   :BYTE2;
        unsigned int  count  :BYTE2;
        unsigned int  fill   :BYTE2;
    } BUCKET_ENT;  /* BUCKET declared as array of this type */
40  /*****************************************************************/ typedef struct
    {
        unsigned int  head   :BYTE2;
45      unsigned int  tail   :BYTE2;
        unsigned int  count  :BYTE2;
        unsigned int  fill   :BYTE2;
    } TMO_BUCKET_ENTRY;  /* TMO_BUCKET declared as array of this type */
    /*****************************************************************/
50
    typedef struct
    {
        struct  name
        {
55          char  table[MAX_UNIQUE_CHAR_TABLE];
```

Express Mail Label No.
EI957001144US
52-3129

-106-

```
              char    model[MAX_CHAR_MODEL];
              char    owner[MAX_CHAR_OWNER];
          };
          struct  tmo_link
 5        {
              unsigned int  next    :BYTE2;  /* tmo array index */
              unsigned int  prev    :BYTE2;  /* tmo array index */
          };
          struct  table_chain
10        {
              unsigned int  cnode_idx;
              unsigned int  table_idx;   /* code fragment relative */
          };
      } TMO_ENTRY;  /* TMO_ENT declared as array of this type */
15    /*************************************************************/ typedef struct
      {
          unsigned int  next       :BYTE2;  /* link to next CNODE within
20    bucket list */
          unsigned int  prev       :BYTE2;  /* link to prev CNODE within
      bucket list */
          unsigned int  mru_next   :BYTE2;  /* link to next CNODE within
      MRU list */
25        unsigned int  mru_prev   :BYTE2;  /* link to prev CNODE within
      MRU list */
          unsigned int  num_words_code;
          unsigned int  cmd_type      :BYTE2;
          unsigned int  num_host_var  :BYTE2;
30        int bucket;                        /* -1 if not in a bucket */
          unsigned int  state      :BYTE2;
          unsigned int             :BYTE2;
          unsigned int  num_touches;
          unsigned int             :36;  /* filler to make entry a power of two
35    in size */
      } CNODE_ENTRY;  /* CNODE declared as array of this type */
      /*************************************************************/
```

From the above, it is seen how the control mechanism of the present invention improves system performance. It will be appreciated that many changes may be made to the preferred embodiment of the present invention without departing from its teachings. For example, the present invention may be used in different types of data processing systems and in processing different types of queries. The present invention may also be used with other data item formats, etc.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A multicache system configurable within a primary memory of a host system for improving the performance of a number of processes running on the host system in processing complex database query statements, the multicache system comprising:

(a) a plurality of local caches in main memory corresponding to the number of processes being run on the host system, each local cache being associated with a different one of the processes being run; and (b) at least one configured central cache system located in a predefined area of primary memory shared by the processes, the central cache system being operatively coupled to each of the plurality of local cache systems associated therewith, said central cache system including:

a number of shared control structures used for controlling access to the central cache system;

a number of sets of central cache control structures corresponding to the number of central caches configured for storing code segments; and, a control mechanism operatively coupled to the number of shared control structures and to the number of sets of central cache structures, the control mechanism being operative to control the configuration and operation of each of the central caches so that generated code segments produced by any one of the processes for executing a complex database query statement are stored automatically in the local cache associated with the process and in the central cache configured to be associated therewith for use by other processes associated with the same central cache in processing logically equivalent complex database query statements.

2. The system of claim 1 wherein the host system further includes a number of interfaces which operatively couple to the central cache system for configuring and operating the number of central caches.

3. The system of claim 2 wherein the multicache system further includes a cache utility program component operatively coupled to receive utility directives entered into the system by a user and operatively coupled to the central cache system, the cache utility program component operatively coupled to a first one of the number of interfaces, the cache utility program component in response to the user initiated directives being operative to issue utility functions for invoking the control mechanism to perform a sequence of operations for carrying out the specified functions.

4. The system of claim 3 wherein the utility directives include commands for specifying clearing, creating and deleting central caches within the central cache system.

5. The system of claim 2 wherein the host system includes a configuration file for storing user entered configuration parameters defining the characteristics of the central caches to be configured, the number of interfaces including a second interface operatively coupled to the configuration file and to the central cache system, the second interface being operative when a process is put in execution to invoke the control mechanism for storing parameter information in specific ones of the shared control structures and into a specified one of the number of sets of central cache control structures derived from the configuration file.

6. The system of claim 5 wherein the configuration parameters include a central cache name parameter for specifying the central cache to be used and a use central cache parameter specifying if processes are to access code segments in central cache.

7. The system of claim 5 wherein the second interface operatively couples to the plurality of local caches and wherein the configuration parameters include a max local cache entries parameter for defining a maximum number of entries to be cached simultaneously in a local cache and a max local cache words parameter defining a maximum number of words to be used by a local cache.

8. The system of claim 2 wherein the number of interfaces includes a third interface operatively coupled to receive internal commands generated by a process during the processing of database query statements, the third interface being operatively coupled to the central cache system of invoking the control mechanism to carry out those operations required for executing the internal commands.

9. The system of claim 8 wherein the internal commands include an insert command, a delete command, a find command, a clear command and a print info command.

10. The system of claim 2 wherein the number of interfaces includes a fourth interface operatively coupled to receive command calls from processes running on the host system, the fourth interface being operatively coupled to the central cache system and operative in response to the command calls invoke the control mechanism for carrying out operations specified by the command calls.

11. The system of claim 10 wherein the command calls include a generate central report command call used for generating statistics for the central cache system and a reset central statistics command call used for resetting statistics for the central cache system.

12. The system of claim 1 wherein the central cache system includes a persistent memory segment for storing the shared control structures, the memory including a number of memory sections, each section being associated with a different configured central cache and each section including first descriptor values for identifying one of the shared control structures corresponding to a directory control store structure and a set of descriptors for identifying one of the number of sets of central cache structures defining those components required for operating the configured central cache associated therewith.

13. The system of claim 12 wherein the directory control structure includes a number of indexed entry locations, each location for storing a value defining a name identifier for a set of central cache control structures for operating a configured central cache and for defining an index value identifying the set of descriptors associated with the configured central cache.

14. The system of claim 13 wherein the set of control structures includes:

a cache data structure for defining the characteristics of the central cache, a bucket structure, a cnode structure and a code descriptor structure for accessing code segments in the central cache associated therewith.

15. The system of claim 1 wherein the complex database query statements are SQL statements used for accessing relational database facilities of the host system and wherein the generated code correspond to the statements for executing the query statements.

16. The system of claim 1 wherein the shared control structures are stored in a predefined area of memory which is inaccessible by the processes running on the host system and which endures for a substantially long period of time.

17. The system of claim 12 wherein the memory segment further includes a separate section for storing a number of pairs of descriptors sequentially allocated to each configured central cache during the configuration thereof, each allocated pair of descriptors providing information to straggling processes pertaining to the central caches associated therewith for enabling the processes to detect that a central cache has been deleted from the central cache system.

18. A method of organizing a multicache system within a primary memory of a host system for improving the performance of a number of processes running on the host system in processing complex database query statements, the multicache system including a plurality of local caches in main memory corresponding to the number of processes being run on the host system, each local cache being associated with a different one of the processes being run, the method comprising the steps of:
(a) configuring at least one configured central cache system in a predefined area of primary memory shared by the processes, the central cache system being operatively coupled to each of the plurality of local cache systems associated therewith;
(b) including in the central cache system, a number of shared control structures used for controlling access thereto;
(c) including in the central cache system, a number of sets of central cache control structures corresponding to the number of central caches configured for storing code segments; and,
(d) including in the central cache system, a control mechanism operatively coupled to the number of shared control structures and to the number of sets of central cache structures, the control mechanism being operative to control the configuration and operation of each of the configured central caches so that generated code segments produced by any one of the processes for executing a complex database query statement are stored automatically in the local cache associated with the process and in the central cache associated therewith for use by other processes configured to be associated with the same central cache in processing logically equivalent complex database query statements.

19. The method of claim 18 further including the step of:
(e) including in the host system, a number of interfaces that operatively couple to the central cache system for configuring and operating the number of central caches.

20. The method of claim 19 wherein the method further includes the steps of:
including a cache utility program component operatively coupled to receive utility directives entered into the system by a user and operatively coupled to the control central cache system; operatively coupling the cache utility program component to a first one of the number of interfaces; and,
issuing utility functions by the cache utility program component in response to the user initiated directives for invoking the control mechanism to perform a sequence of operations for carrying out the specified functions.

21. The method of claim 20 wherein the utility directives include commands for specifying clearing, creating and deleting central caches within the central cache system.

22. The method of claim 19 wherein the host system includes a configuration file for storing user entered configuration parameters defining the characteristics of the central caches to be configured and the method further includes the steps of:
operatively coupling a second one of the interfaces to the configuration file and to the central cache system; invoking the control mechanism by the second interface when a process is put in execution for storing parameter information in specific ones of the shared control structures and into a specified one of the number of sets of central cache control structures derived from the configuration file.

23. The method of claim 22 wherein the configuration parameters include a central cache name parameter for specifying the central cache to be used and a use central cache parameter specifying if processes are to access code segments in central cache.

24. The method of claim 22 wherein the method further includes the step of operatively coupling the second interface to the plurality of local caches and wherein the configuration parameters include a max local cache entries parameter for defining a maximum number of entries to be cached simultaneously in a local cache and a max local cache words parameter defining a maximum number of words to be used by a local cache.

25. The method of claim 19 wherein the method further includes the steps of:
including a third one of the interfaces which operatively couples to receive internal commands generated by a process during the processing of database query statements; and
operatively coupling the third interface to the central cache system for invoking the control mechanism to carry out those operations required for executing the internal commands.

26. The method of claim 25 wherein the internal commands include an insert command, a delete command, a find command, a clear command and a print info command.

27. The method of claim 19 wherein the method further includes the steps of:
including a fourth one of the interfaces that operatively couples to receive command calls from processes running on the host system; and
operatively coupling the fourth interface to the central cache system for invoking the control mechanism in response to the command calls for carrying out operations specified by the command calls.

28. The method of claim 27 wherein the command calls include a generate central report command call used for generating statistics for the central cache system and a reset central statistics command call used for resetting statistics for the central cache system.

29. The method of claim 18 wherein the method further includes:
utilizing a persistent memory segment in the central cache system for storing the shared control structures, the memory segment including a number of memory sections, each section being associated with a different configured central cache and each including first descriptor values for identifying one of the shared structures corresponding to a directory control store structure and a set of descriptors for identifying one of the number of sets of central cache structures defining those components required for operating the configured central cache associated therewith.

30. The method of claim 29 wherein the directory control structure includes a number of indexed entry locations, each location for storing a value defining a name identifier for a set of central cache control structures for operating a configured central cache and for defining an index value identifying the set of descriptors associated with the configured central cache.

31. The method of claim 30 wherein the set of control structures includes:

a cache data structure for defining the characteristics of the central cache, a bucket structure, a cnode structure and a code descriptor structure for accessing code segments in the central cache associated therewith.

32. The method of claim 29 wherein the method further includes the steps of:

utilizing a separate section for storing a number of pairs of descriptors sequentially allocated to each configured central cache during the configuration thereof, each allocated pair of descriptors providing information to straggling processes pertaining to the central caches associated therewith for enabling the processes to detect that a central cache has been deleted from the central cache system.

33. A computer main memory containing a number of segments for storing data and control structures for improving the performance of a number of processes on a host system in processing complex database query statements, the data and control structures comprising:

(a) a plurality of local caches in a corresponding number of main memory segments corresponding to the number of processes being run on the host system, each local cache being associated with a different one of the processes being run; and (b) at least one configured central cache system located in a predefined area of another one of the segments of main memory shared by the processes, the central cache system being operatively coupled to each of the plurality of local cache systems associated therewith, said central cache system including:

a number of shared control structures used for controlling access to the central cache system; and, a number of sets of central cache control structures corresponding to the number of central caches configured for storing code segments; the sets of central cache structures enabling configuration and operation of each of the central caches so that generated code segments produced by any one of the processes for executing a complex database query statement are stored automatically in the local cache associated with the process and in the central cache configured to be associated therewith for use by other processes associated with the same central cache in processing logically equivalent complex database query statements.

34. A multicache system configurable within a primary memory of a host system for improving the performance of a number of processes running on the host system in processing complex database query statements, the multicache system comprising:

(a) a plurality of local caches in main memory corresponding to the number of processes being run on the host system, each local cache being associated with a different one of the processes being run; and (b) at least one configured central cache system located in a shared predefined area of primary memory, the central cache system being operatively coupled to each of the plurality of local cache systems associated therewith, said central cache system including:

a number of shared control structures used for controlling access to the central cache system;

a number of sets of central cache control structures corresponding to the number of central caches configured for storing code segments; and, a control mechanism operatively coupled to the number of shared control structures and to the number of sets of central cache structures, the control mechanism being operative to control the configuration and operation of each of the central caches so that generated code segments produced by any one of the processes for executing a complex database query statement are automatically stored in the local cache associated with the process and in the configured central cache associated therewith for use by other processes associated with the same central cache in processing logically equivalent complex database query statements;

(c) a number of interfaces which operatively couple to the central cache system for configuring and operating the number of central caches; and, (d) a cache utility program component operatively coupled to receive utility directives entered into the system by a user and operatively coupled to the central cache system, the cache utility program component being operatively coupled to a first one of the number of interfaces, the cache utility program component in response to the user initiated directives being operative to issue utility functions for invoking the control mechanism to perform a sequence of operations for carrying out the specified functions.

35. A multicache system configurable within a primary memory of a host system for improving the performance of a number of processes running on the host system in processing complex database query statements, the multicache system comprising:

(a) a plurality of local caches in main memory corresponding to the number of processes being run on the host system, each local cache being associated with a different one of the processes being run; and (b) at least one configured central cache system located in a shared predefined area of primary memory, the central cache system being operatively coupled to each of the plurality of local cache systems associated therewith, said central cache system including:

a number of shared control structures used for controlling access to the central cache system;

a number of sets of central cache control structures corresponding to the number of central caches configured for storing code segments; and, a control mechanism operatively coupled to the number of shared control structures and to the number of sets of central cache structures, the control mechanism being operative to control the configuration and operation of each of the central caches so that generated code segments produced by any one of the processes for executing a complex database query statement are automatically stored in the local cache associated with the process and in the configured central cache associated therewith for use by other processes associated with the same central cache in processing logically equivalent complex database query statements;

(c) a number of interfaces which operatively couple to the cell cache system for configuring and operating the number of central caches; and, (d) a configuration file for storing user entered configuration parameters defining the characteristics of the central caches to be configured, the number of interfaces includes a second interface operatively coupled to the configuration file and to the central cache system, the second interface being operative when a process is put in execution to invoke the control mechanism for storing parameter information in specific ones of the shared control structures and into a specified one of the number of sets of central cache control structures derived from the configuration file.

36. A multicache system configurable within a primary memory of a host system for improving the performance of a number of processes running on the host system in processing complex database query statements, the multicache system comprising:

(a) a plurality of local caches in main memory corresponding to the number of processes being run on the host system, each local cache being associated with a different one of the processes being run; and (b) at least one configured central cache system located in a shared predefined area of primary memory, the central cache system being operatively coupled to each of the plurality of local cache systems associated therewith, sad central cache system including:

a number of shared control structures used for controlling access to the central cache system;

a number of sets of central cache control structures corresponding to the number of central caches configured for storing code segments; and, a control mechanism operatively coupled to the number of shared control structures and to the number of sets of central cache structures, the control mechanism being operative to control the configuration and operation of each of the central caches so that generated code segments produced by any one of the processes for executing a complex database query statement are automatically stored in the local cache associated with the process and in the configured central cache associated therewith for use by other processes associated with the same central cache in processing logically equivalent complex database query statements; and, (c) a number of interfaces which operatively couple to the central cache system for configuring and operating the number of central caches; the number of interfaces including a fourth interface operatively coupled to receive command calls from processes running on the host system, the fourth interface being operatively coupled to the central cache system and operative in response to the command calls to invoke the control mechanism for carrying out operations specified by the command calls, the command calls including a generate central report command call used for generating statistics for the central cache system and a reset central statistics command call used for resetting statistics for the central cache system.

37. A multicache system configurable within a primary memory of a host system for improving the performance of a number of processes running on the host system in processing complex database query statements, the multicache system comprising:

(a) a plurality of local caches in main memory corresponding to the number of processes being run on the host system, each local cache being associated with a different one of the processes being run; and (b) at least one configured central cache system located in a shared predefined area of primary memory, the central cache system being operatively coupled to each of the plurality of local cache systems associated therewith, said central cache system including:

a number of shared control structures used for controlling access to the central cache system;

a number of sets of central cache control structures corresponding to the number of central caches configured for storing code segments; and, a control mechanism operatively coupled to the number of stared control structures and to the number of sets of central cache structures, the control mechanism being operative to control the configuration and operation of each of the central caches so that generated code segments produced by any one of the processes for executing a complex database query statement are automatically stored in the local cache associated with the process and in the configured central cache associated therewith for use by other processes associated with the same central cache in processing logically equivalent complex database query statements; and, a persistent memory segment for storing the shared control structures, the memory including a number of memory sections, each section being associated with a different configured central cache and each section including first descriptor values for identifying one of the shared control structures corresponding to a directory control store structure and a set of descriptors for identifying one of the number of sets of central cache structures defining those components required for operating the configured central cache associated therewith, the persistent memory segment further including a separate section for storing a number of pairs of descriptors sequentially allocated to each configured central cache during the configuration thereof, each allocated pair of descriptors providing information to straggling processes pertaining to the central caches associated therewith for enabling the processes to detect that a central cache has been deleted from the central cache system.

38. A method of organizing a multicache system within a primary memory of a host system for improving the performance of a number of processes running on the host system in processing complex database query statements, the multicache system including a plurality of local caches in main memory corresponding to the number of processes being run on the host system, each local cache being associated with a different one of the processes being run, the method comprising the steps of:

(a) configuring at least one central cache system in a shared predefined area of primary memory, the central cache system being operatively coupled to each of the plurality of local cache systems associated therewith;

(b) including in the central cache system, a number of shared control structures used for controlling access thereto;

(c) including in the central cache system, a number of sets of central cache control structures corresponding to the number of central caches configured for storing code segments;

(d) including in the central cache system, a control mechanism operatively coupled to the number of shared control structures and to the number of sets of central cache structures, the control mechanism being operative to control the configuration and operation of each of the central caches so that generated code segments produced by any one of the processes for executing a complex database query statement are automatically stored in the local cache associated with the process and in the configured central cache associated therewith for use by other processes associated with the same central cache in processing logically equivalent complex database query statements;

(e) including in the host system, a number of interfaces that operatively couple to the central cache system for configuring and operating the number of central caches;

(f) including a cache utility program component operatively coupled to receive utility directives entered into the system by a user and operatively coupled to the control central cache system; operatively coupling the cache utility program component to a first one of the number of interfaces; and, (g) issuing utility functions by the cache utility program component in response to the user initiated directives for invoking the control mechanism to perform a sequence of operations for carrying out the specified functions.

39. A method of organizing a multicache system within a primary memory of a host system for improving the performance of a number of processes running on the host system in processing complex database query statements, the multicache system including a plurality of local caches in main memory corresponding to the number of processes being run on the host system, each local cache being associated with a different one of the processes being run, the method comprising the steps of:

(a) configuring at least one configured central cache system in a shared predefined area of primary memory, the central cache system being operatively coupled to each of the plurality of local cache systems associated therewith;

(b) including in the central cache system, a number of shared control structures used for controlling access thereto;

(c) including in the central cache system, a number of sets of central cache control structures corresponding to the number of central caches configured for storing code segments;

(d) including in the central cache system, a control mechanism operatively coupled to the number of shared control structures and to the number of sets of central cache structures, the control mechanism being operative to control the configuration and operation of each of the central caches so that generated code segments produced by any one of the processes for executing a complex database query statement are automatically stored in the local cache associated with the process and in the configured central cache associated therewith for use by other processes associated with the same central cache in processing logically equivalent complex database query statements (e) including in the host system a number of interfaces that operatively couple to the central cache system for configuring and operating the number of central caches, the host system including a configuration file for storing user entered configuration parameters defining the characteristics of the central caches to be configured and a second one of the interfaces being operatively coupled to the configuration file; and, (f) invoking the control mechanism by the second interface when a process is put in execution for storing parameter information in specific ones of the shared control structures and into a specified one of the number of sets of central cache control structures derived from the configuration file.

40. A method of organizing a multicache system within a primary memory of a host system for improving the performance of a number of processes running on the host system in processing complex database query statements, the multicache system including a plurality of local caches in main memory corresponding to the number of processes being run on the host system, each local cache being associated with a different one of the processes being run, the method comprising the steps of:

(a) configuring at least one configured central cache system in a shared predefined area of primary memory, the central cache system being operatively coupled to each of the plurality of local cache systems associated therewith;

(b) including in the central cache system, a number of shared control structures used for controlling access thereto;

(c) including in the central cache system, a number of sets of central cache control structures corresponding to the number of central caches configured for storing code segments;

(d) including in the central cache system, a control mechanism operatively coupled to the number of shared control structures and to the number of sets of central cache structures, the control mechanism being operative to control the configuration and operation of each of the central caches so that generated code segments produced by any one of the processes for executing a complex database query statement are automatically stored in the local cache associated with the process and in the configured central cache associated therewith for use by other processes associated with the same central cache in processing logically equivalent complex database query statements;

(e) utilizing a persistent memory segment in the central cache system for storing the shared control structures, the memory segment including a number of memory sections, each section being associated with a different configured central cache and each including first descriptor values for identifying one of the shared structures corresponding to a directory control store structure and a set of descriptors for identifying one of the number of sets of central cache structures defining those components required for operating the configured central cache associated therewith; and, (f) utilizing a separate section for storing a number of pairs of descriptors sequentially allocated to each configured central cache during the configuration thereof, each allocated pair of descriptors providing information to straggling processes pertaining to the central caches associated therewith for enabling the processes to detect that a central cache has been deleted from the central cache system.

* * * * *